US011783790B2

(12) United States Patent
Wang et al.

(10) Patent No.: US 11,783,790 B2
(45) Date of Patent: Oct. 10, 2023

(54) DISPLAY SUBSTRATE AND DRIVING METHOD THEREFOR, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhe Wang, Beijing (CN); Qingqing Ma, Beijing (CN); Chao Tian, Beijing (CN); Rui Xu, Beijing (CN); Shuo Li, Beijing (CN); Min Wang, Beijing (CN); Xiang Yuan, Beijing (CN); Linyu Li, Beijing (CN); Haizhou Ren, Beijing (CN); Haiyang Tian, Beijing (CN); Kaifeng Wang, Beijing (CN); Yinan Gao, Beijing (CN); Guojie Qin, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 427 days.

(21) Appl. No.: 17/050,302

(22) PCT Filed: Jul. 17, 2019

(86) PCT No.: PCT/CN2019/096363
§ 371 (c)(1),
(2) Date: Oct. 23, 2020

(87) PCT Pub. No.: WO2021/007807
PCT Pub. Date: Jan. 21, 2021

(65) Prior Publication Data
US 2023/0121668 A1  Apr. 20, 2023

(51) Int. Cl.
*G09G 3/34* (2006.01)
*G02F 1/1685* (2019.01)
*G02F 1/1681* (2019.01)
*G02F 1/167* (2019.01)

(52) U.S. Cl.
CPC ............ *G09G 3/344* (2013.01); *G02F 1/167* (2013.01); *G02F 1/1681* (2019.01);
(Continued)

(58) Field of Classification Search
CPC .......... G09G 3/344; G09G 2300/0426; G09G 2310/08; G09G 2320/0666;
(Continued)

(56) References Cited

U.S. PATENT DOCUMENTS

2004/0032389 A1* 2/2004 Liang .................... G02F 1/1677
345/107
2010/0195188 A1 8/2010 Huang et al.
(Continued)

FOREIGN PATENT DOCUMENTS

CN       1900803 A    1/2007
CN     101782707 A    7/2010
(Continued)

*Primary Examiner* — Roy P Rabindranath
(74) *Attorney, Agent, or Firm* — Procopio, Cory, Hargreaves & Savitch LLP

(57) ABSTRACT

A display substrate includes a first substrate, a microcup structure layer, an electrophoretic liquid and a second substrate. The first substrate includes a pixel electrode layer which includes a plurality of pixel electrodes. The microcup structure layer is disposed on a side of the first substrate. The microcup structure layer includes a plurality of microcups, each microcup has a first opening and a second opening opposite to the first opening, the first opening is closer to the pixel electrode layer than the second opening, a size of the first opening being greater than a size of the second opening. The electrophoretic fluid is filled in the plurality of micro- (Continued)

cups, and the electrophoretic fluid is incorporated with charged particles. The second substrate is disposed on a side, away from the first substrate, of the microcup structure layer with the electrophoretic fluid, and the second substrate includes a common electrode layer.

20 Claims, 10 Drawing Sheets

(52) U.S. Cl.
CPC ... *G02F 1/1685* (2019.01); *G09G 2300/0426* (2013.01); *G09G 2310/0254* (2013.01); *G09G 2310/08* (2013.01); *G09G 2320/0242* (2013.01); *G09G 2320/0666* (2013.01); *G09G 2330/021* (2013.01)

(58) Field of Classification Search
CPC . G09G 2330/021; G02F 1/1681; G02F 1/167; G02F 1/1685
See application file for complete search history.

(56) References Cited

U.S. PATENT DOCUMENTS

| | | | |
|---|---|---|---|
| 2011/0242640 A1* | 10/2011 | Lin | G02F 1/1675 |
| | | | 345/107 |
| 2013/0258449 A1* | 10/2013 | Paolini, Jr. | G09G 3/2003 |
| | | | 359/296 |
| 2015/0187282 A1 | 7/2015 | Lee | |
| 2015/0219978 A1* | 8/2015 | Moriwaki | G09G 3/3446 |
| | | | 359/296 |
| 2020/0292488 A1* | 9/2020 | Lim | G02F 1/167 |

FOREIGN PATENT DOCUMENTS

| | | |
|---|---|---|
| CN | 101859048 A | 10/2010 |
| CN | 101923263 A | 12/2010 |
| CN | 201886252 U | 6/2011 |
| CN | 104749851 A | 7/2015 |

\* cited by examiner

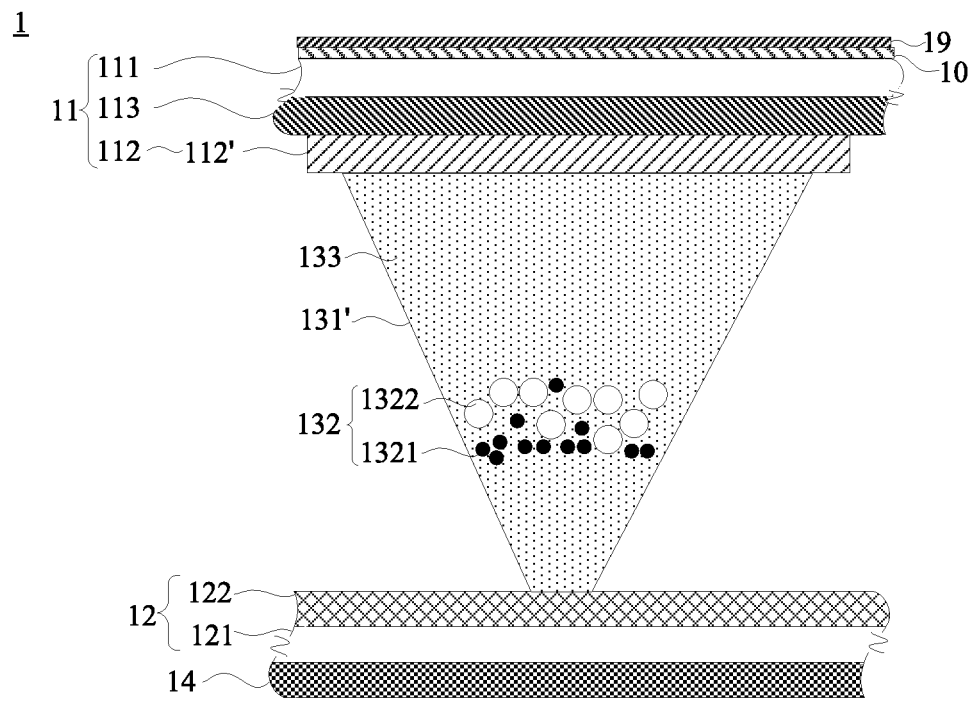

FIG. 7

| A pixel voltage signal is transmitted for a target time to a pixel electrode corresponding to a pixel that is to display a target color in the display substrate, and a common voltage signal is transmitted for the target time to the common electrode layer of the display substrate, so that a target voltage with a target value and a target polarity is generated between the pixel electrode and the common electrode layer. | ~ S100 |

| Charged particles in a region of the pixel to display the target color are driven by an electric field formed by the target voltage to swim for the target time, so that charged particles of the target color are closer to the first opening(s) of corresponding microcup(s) than the charged particles of the other color(s). | S200 |

FIG. 8

A first pixel voltage signal is transmitted for a first target time to a pixel electrode corresponding to a pixel that is to display the first color, and a common voltage signal is transmitted forThe first target time to the common electrode layer, so that a first target voltage with a first target value and a first target polarity is generated between the pixel electrode and the common electrode layer. — S110

Charged particles in a region of the pixel to display the first color are driven by the electric field formed by the first target voltage to swim to first opening(s) of corresponding microcup(s) for the first target time, so that the charged particles of the first color are closer to the first opening(s) of the corresponding microcup(s) than the charged particles of the second color. — S210

FIG. 9

A second pixel voltage signal is transmitted for a second target time to a pixel electrode corresponding to a pixel that is to display the second color, and a common voltage signal is transmitted for the second target time to the common electrode layer, so that a second target voltage with a second target value and a second target polarity is generated between the pixel electrode and the common electrode layer. — S120

Charged particles in a region of the pixel to display the second color are driven by the electric field formed by the second target voltage to swim to second opening(s) of corresponding microcup(s) for the second target time, so that the charged particles of the first color and the charged particles of the second color are stratified, and the charged particles of the first color are closer to the second opening(s) of the corresponding microcup(s) than the charged particles of the second color. — S220

A third pixel voltage signal is transmitted for a third target time to the pixel electrode corresponding to the pixel that is to display the second color, and a common voltage signal is transmitted for the third target time to the common electrode layer, so that a third target voltage with a third target value and the first target polarity is generated between the pixel electrode and the common electrode layer. — S130

The charged particles in the region of the pixel to display the second color are driven by the electric field formed by the third target voltage to swim to first opening(s) of the corresponding microcup(s) for the third target time, so that the charged particles of the second color are closer to the first opening(s) of the corresponding microcup(s) than the charged particles of the first color. The third target time is greater than the second target time. — S230

FIG. 10

S300 — A fourth pixel voltage signal is transmitted for a set time to a pixel electrode corresponding to a pixel that is to display the set color in the display substrate, and a common voltage signal is transmitted for the set time to the common electrode layer of the display substrate, so that a set voltage with a set value and a set polarity is generated between the pixel electrode and the common electrode layer.

S400 — Charged particles in a region of the pixel to display the set color are driven by the electric field formed by the set voltage to swim to second opening(s) of corresponding microcup(s) for the set time, so that the charged particles are gathered at the second opening(s) of the corresponding microcup(s) and a surrounding region thereof.

FIG. 11

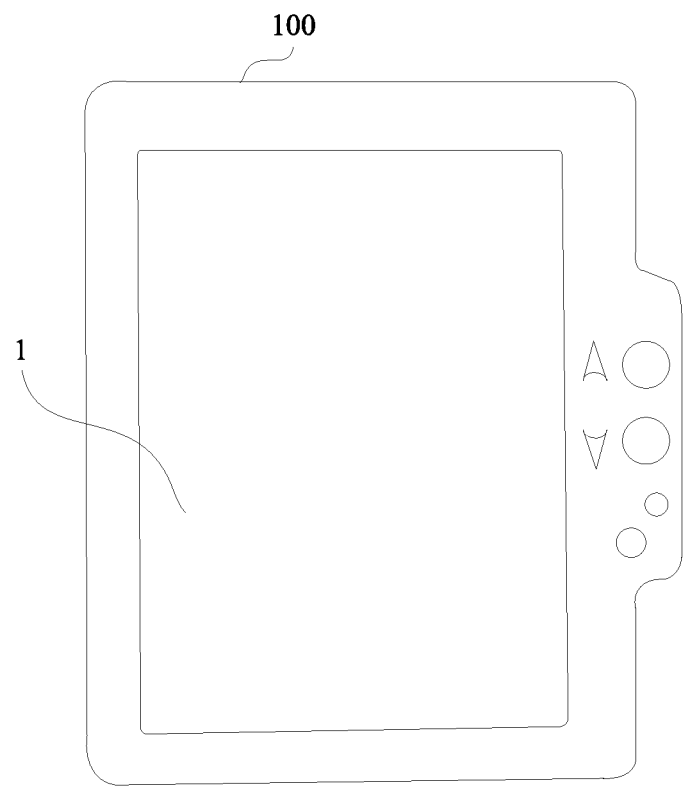

FIG. 12

DISPLAY SUBSTRATE AND DRIVING METHOD THEREFOR, AND DISPLAY DEVICE

CROSS-REFERENCE TO RELATED APPLICATIONS

This application is a national phase entry under 35 USC 371 of International Patent Application No. PCT/CN2019/096363 filed on 17 Jul. 2019, which is incorporated herein by reference in its entirety.

TECHNICAL FIELD

The present disclosure relates to the field of display technologies, and in particularly, to a display substrate and a driving method therefor, and a display device.

BACKGROUND

In an electronic paper, mainly by using an electrophoretic display (EPD) technology, colored particles with two different electrical properties are driven to move back and forth between a display side and a non-display side of the electronic paper, and a color of corresponding colored particles is displayed on the display side. Display devices capable of displaying three colors, i.e., black, white and red, are relatively common in the electronic paper. A display effect of the electronic paper is close to that of a natural paper, which allows readers to be free from reading fatigue when the readers read contents displayed on the electronic paper.

SUMMARY

In an aspect, a display substrate is provided. The display substrate includes a first substrate, a microcup structure layer, an electrophoretic liquid, and a second substrate. The first substrate includes a pixel electrode layer, and the pixel electrode layer includes a plurality of pixel electrodes. The microcup structure layer is disposed on a side of the first substrate, the microcup structure layer includes a plurality of microcups, each microcup has a first opening and a second opening opposite to the first opening, the first opening is closer to the pixel electrode layer than the second opening, and a size of the first opening is greater than a size of the second opening. The electrophoretic fluid is filled in the plurality of microcups, and the electrophoretic fluid is incorporated with charged particles. The second substrate is disposed on a side, away from the first substrate, of the microcup structure layer with the electrophoretic fluid, and the second substrate includes a common electrode layer.

In some embodiments, the electrophoretic fluid is incorporated with charged particles of at least two colors, the charged particles of the at least two colors have a same electrical property, and mobilities of charged particles of different colors are different.

In some embodiments, the charged particles of the at least two colors include charged particles of a first color and charged particles of a second color, and the charged particles of the first color have a greater specific charge than the charged particles of the second color.

In some embodiments, the display substrate further includes a reflective layer disposed at a side, close to the common electrode layer or the pixel electrode layer, of the microcup structure layer, and the reflective layer is configured to reflect light of a set color.

In some embodiments, an orthographic projection of the second opening of each microcup on the second substrate has a shape of a closed figure, and a distance from any point on a boundary of the closed figure to any other point on the boundary of the closed figure is less than or equal to a limit resolution size of human eyes.

In some embodiments, a width of a gap between orthographic projections of first openings of two adjacent microcups on the first substrate is less than or equal to the limit resolution size of the human eyes.

In some embodiments, the distance from any point on the boundary of the closed figure to any other point on the boundary of the closed figure is less than or equal to 15 µm. The width of the gap between the orthographic projections of the first openings of the two adjacent microcups on the first substrate is less than or equal to 15 µm.

In some embodiments, a shape of each microcup is a truncated pyramid or a truncated cone.

In some embodiments, the shape of each microcup is a regular hexagonal truncated pyramid.

In some embodiments, a shortest distance between two opposite sides of the first opening of each microcup ranges from 140 µm to 160 µm. A width of a gap between orthographic projections of second openings of two adjacent microcups on the second substrate ranges from 140 µm to 160 µm.

In some embodiments, a size of each microcup in a direction perpendicular to the first substrate ranges from 140 µm to 160 µm.

In some embodiments, the first substrate further includes a first base, an active device layer, a plurality of transparent first storage capacitor electrodes, and a plurality of transparent second storage capacitor electrodes. The first base is disposed at a side, away from the microcup structure layer, of the pixel electrode layer. The active device layer is disposed between the first base and the pixel electrode layer. The active device layer includes a plurality of driving switch transistors, and the plurality of driving switch transistors are electrically connected to the plurality of pixel electrodes in the pixel electrode layer. The plurality of transparent first storage capacitor electrodes are electrically connected to the plurality of driving switch transistors. The plurality of transparent second storage capacitor electrodes correspond to the plurality of first storage capacitor electrodes. There is an overlapping region between an orthographic projection of a first storage capacitor electrode on the first base and an orthographic projection of a corresponding second storage capacitor electrode on the first base.

In some embodiments, each of the plurality of driving switch transistors includes a gate, a source, and a drain, and the gate, the source and the drain are made of a transparent material.

In another aspect, a display device is provided. The display device includes the above display substrate.

In yet another aspect, a method for driving a display substrate is provided. The driving method is configured to drive the above display substrate. The display substrate has ink state modes of at least two colors. For each of the ink state modes of the at least two colors, the driving method includes: transmitting a pixel voltage signal for a target time to a pixel electrode corresponding to a pixel that is to display a target color in the display substrate, and transmitting a common voltage signal for the target time to the common electrode layer of the display substrate, so that a target voltage with a target value and a target polarity is generated between the pixel electrode and the common electrode layer, and charged particles in a region of the pixel to display the target color are driven by an electric field formed by the target voltage to swim for the target time, so that charged particles of the target color are closer to the first opening of the microcup where the charged particles are located than charged particles of other colors, wherein the target value, the target polarity, and the target time is an absolute value, a polarity and a duration of a voltage required to enter an ink state mode of the target color, determined according to a difference in mobilities of the charged particles of different colors in the display substrate.

In some embodiments, the display substrate includes charged particles of a first color and charged particles of a second color, and a mobility of the charged particles of the first color is greater than a mobility of the charged particles of the second color. The display substrate has an ink state mode of the first color and an ink state mode of the second color.

In some embodiments, for the ink state mode of the first color, the driving method includes: transmitting a first pixel voltage signal for a first target time to a pixel electrode corresponding to a pixel that is to display the first color, and transmitting a common voltage signal for the first target time to the common electrode layer, so that a first target voltage with a first target value and the first target polarity is generated between the pixel electrode and the common electrode layer, the first target polarity being opposite to a polarity of the charged particles, and charged particles in a region of the pixel to display the first color are driven by an electric field formed by the first target voltage to swim to the first opening of the microcup where the charged particles are located for the first target time, so that the charged particles of the first color are closer to the first opening of the microcup where the charged particles are located than the charged particles of the second color.

In some embodiments, for the ink state mode of the second color, the driving method includes a plurality of driving cycles, and each of the driving cycles includes: transmitting a second pixel voltage signal for a second target time to a pixel electrode corresponding to a pixel that is to display the second color, and transmitting a common voltage signal for the second target time to the common electrode layer, so that a second target voltage with a second target value and a second target polarity is generated between the pixel electrode and the common electrode layer, the second target polarity being the same as the polarity of the charged particles, and charged particles in a region of the pixel that is to display the second color are driven by an electric field formed by the second target voltage to swim to the second opening of microcup where the charged particles are located for the second target time, so that the charged particles of the first color and the charged particles of the second color are stratified, and the charged particles of the first color are closer to the second opening of the microcup where the charged particles are located than the charged particles of the second color; transmitting a third pixel voltage signal for a third target time to a pixel electrode corresponding to the pixel that is to display the second color, and transmitting a common voltage signal for the third target time to the common electrode layer, so that a third target voltage with a third target value and a first target polarity is generated between the pixel electrode and the common electrode layer, the third target value being smaller than the second target value, and the charged particles in the region of the pixel to display the second color are driven by an electric field formed by the third target voltage to swim to the first opening of the microcup where the charged particles are located for the third target time, so that the charged particles of the second color are closer to the first opening of the microcup where the charged particles are located than the charged particles of the first color, wherein the third target time is greater than the second target time.

In some embodiments, the display substrate further includes a reflective layer, and the reflective layer is disposed at a side, proximate to the common electrode layer, of the microcup structure layer in the display substrate, and is configured to reflect light of a set color. The display substrate further has a transparent state mode of the set color. For the transparent state mode of the set color, the driving method includes: transmitting a fourth pixel voltage signal for a set time to a pixel electrode corresponding to a pixel that is to display the set color in the display substrate, and transmitting a common voltage signal for the set time to the common electrode layer of the display substrate, so that a set voltage with a set value and a set polarity is generated between the pixel electrode and the common electrode layer, the set polarity being the same as the polarity of the charged particles, and charged particles in a region of the pixel to display the set color are driven by an electric field formed by the set voltage to swim to the second opening of the microcup where the charged particles are located for the set time, so that the charged particles gather at the second opening of the microcup where the charged particles are located and a surrounding region thereof, wherein the set value, the set polarity, and the set time are an absolute value, a polarity and a duration of a voltage required to enter the transparent state mode of the set color, determined according to the difference in the mobilities of the charged particles of different colors in the display substrate.

In some embodiments, for the transparent state mode of the set color, the driving method further includes: reducing the set value of the set voltage, and/or the set time of driving of the electric field formed by the set voltage, so as to reduce a gather density of the charged particles at the first opening of the microcup where the charged particles are located and a surrounding region thereof, and to make a brightness of the set color displayed by the display substrate low; and increasing the set value of the set voltage, and/or the set time of the driving of the electric field formed by the set voltage, so as to increase the gather density of the charged particles at the first opening of the microcup where the charged particles are located and the surrounding region thereof, and to make the brightness of the set color displayed by the display substrate high.

BRIEF DESCRIPTION OF THE DRAWINGS

In order to describe technical solutions in the present disclosure more clearly, the accompanying drawings to be used in the description of the present disclosure will be introduced below briefly. Obviously, the accompanying drawings to be described below are merely some embodiments of the present disclosure, and a person of ordinary skill in the art can obtain other drawings according to these drawings.

FIG. 7 is a schematic diagram showing a structure of a display substrate in yet another display state, in accordance with some embodiments;

FIG. 8 is a flow diagram of a method for driving a display substrate, in accordance with some embodiments;

FIG. 9 is a flow diagram of another method for driving a display substrate, in accordance with some embodiments;

FIG. 10 is a flow diagram of yet another method for driving a display substrate, in accordance with some embodiments;

FIG. 11 is a flow diagram of yet another method for driving a display substrate, in accordance with some embodiments; and FIG. 12 is a schematic diagram of a display device, in accordance with some embodiments.

DETAILED DESCRIPTION

Technical solutions in some embodiments of the present disclosure will be described below clearly and completely in combination with accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

In a display process of an electronic paper, by driving two kinds of colored particles with different electrical properties in an electrophoretic fluid to move back and forth between a display side and a non-display side of the electronic paper, a plurality of pixels in the electronic paper may be controlled to display a color of colored particles located on the display side. By adding colored particles of a plurality of colors into the electronic paper, a color display of the electronic paper can be achieved.

However, due to the different electrical properties of the two kinds of colored particles in the electrophoretic fluid, a built-in electric field is easily formed between the two kinds of colored particles. As a result, colored particles located on the non-display side in pixel regions in the electronic paper will be driven by the built-in electric field to move to the display side, which causes a color displayed by pixels in the electronic paper to be incorporated with colors of particles of other colors, and affects a display effect of the display side. Therefore, the color displayed by the electronic paper is extremely unstable and needs to be refreshed frequently. This not only increases time for refreshing the electronic paper, but also consumes high power, resulting in a waste of electrical energy.

Figure 1A:
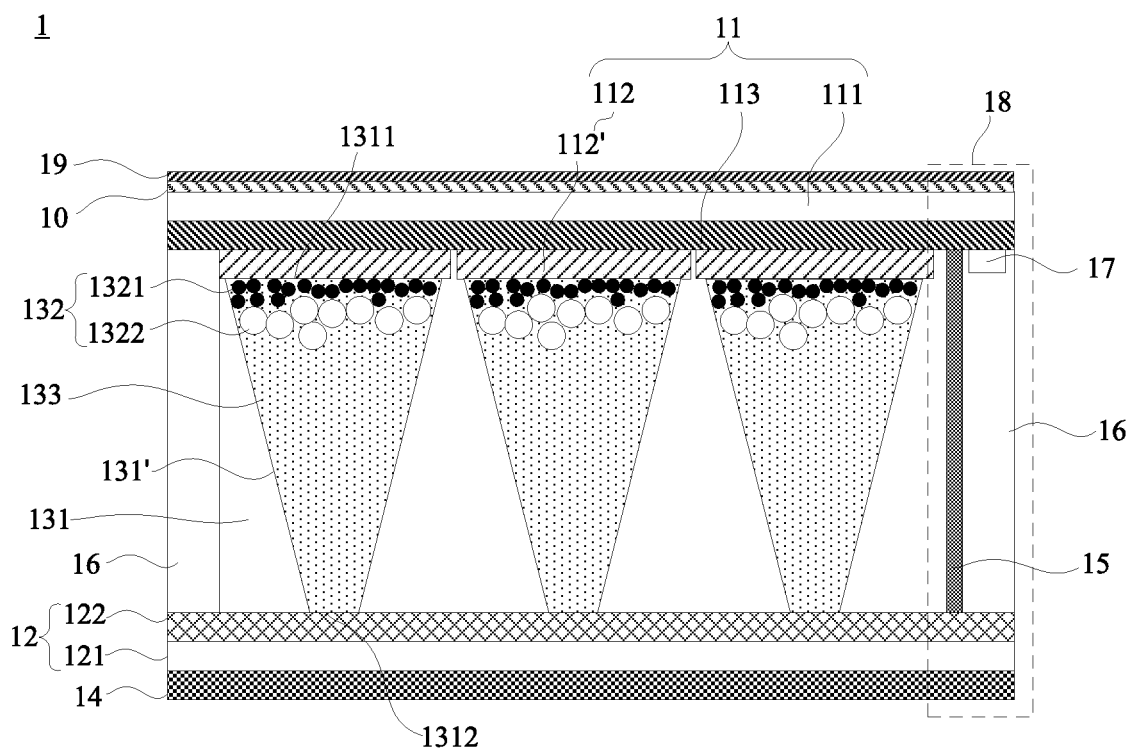
FIG. 1A is a schematic diagram showing a structure of a display substrate, in accordance with some embodiments.

To this end, some embodiments of the present disclosure provide a display substrate 1. As shown in FIG. 1A, the display substrate 1 includes a first substrate 11, a microcup structure layer 131, an electrophoretic fluid 133 and a second substrate 12.

The first substrate 11 includes a pixel electrode layer 112, and the pixel electrode layer 112 includes a plurality of pixel electrodes 112'.

The microcup structure layer 131 is disposed on a side of the first substrate 11, for example, the microcup structure layer 131 is located on a side of the first substrate 11 where the pixel electrode layer 112 is disposed. The microcup structure layer 131 includes a plurality of microcups 131', each microcup 131' of the plurality of microcups 131' has a first opening 1311 close to the pixel electrode layer 112 and a second opening 1312 opposite to the first opening 1311, and a size of each first opening 1311 is greater than a size of a corresponding second opening 1312.

The electrophoretic fluid 133 is filled in the plurality of microcups 131', and is incorporated with charged particles 132.

The second substrate 12 is disposed on a side, away from the first substrate 11, of the microcup structure layer 131 with the electrophoretic fluid 133, and the second substrate 12 includes a common electrode layer 122.

In some embodiments, the first substrate 11 further includes a first base 111, the pixel electrode layer 112 is disposed at a side, facing the microcup structure layer 131, of the first base 111, and the microcup structure layer 131 is disposed on a side, away from the first base 111, of the pixel electrode layer 112. The second substrate 12 further includes a second base 121, and the common electrode layer 122 is disposed on a side, facing the microcup structure layer 131, of the second base 121.

Either a first substrate 11 side or a second substrate 12 side of the display substrate 1 may serve as a display side of the display substrate 1.

For example, as shown in FIG. 1A, the first substrate 11 side of the display substrate 1 serves as the display side of the display substrate 1, and the second substrate 12 side of the display substrate 1 serves as a non-display side of the display substrate 1. In this case, both the first base 111 and the pixel electrode layer 112 are required to have good optical transparency to improve a light transmittance of the display substrate 1. For example, a material of the first base 111 is glass, and the pixel electrode layer 112 is a transparent conductive film such as indium tin oxide (ITO) formed on the first base 111 by using processes such as sputtering and evaporation. In this way, light reflected by the charged particles 132 can pass through the pixel electrode layer 112 and the base 111, and be perceived by human eyes.

In addition, in this case, if a reflective layer 14 is mounted on the second substrate 12 side of the display substrate 1, and the reflective layer 14 is located on a side, away from the common electrode layer 122, of the second base 121, then both the second base 121 and the common electrode layer 122 are required to have good optical transparency to improve the light transmittance of the display substrate 1. For example, a material of the second base 121 is glass, and the common electrode layer 122 is a transparent conductive film such as ITO formed on the second base 121 by using a process such as sputtering or evaporation. In this way, light reflected by the reflective layer 14 can pass through the second base 121, the common electrode layer 122, the microcup structure layer 131, the pixel electrode layer 112, and the first base 111, and be perceived by the human eyes.

If the reflective layer 14 is mounted on the second substrate 12 side of the display substrate 1, and the reflective layer 14 is located on a side, facing the microcup structure layer 131, of the second base 121, then layers between the reflective layer 14 and the microcup structure layer 131 are required to have good optical transparency to improve the light transmittance of the display substrate 1. For example, if the reflective layer 14 is located between the second base 121 and the common electrode layer 122, then the common electrode layer 122 is required to be a transparent conductive film such as ITO formed on the second base 121 by using a process such as sputtering or evaporation. For another example, if the reflective layer 14 is located between the common electrode layer 122 and the microcup structure layer 131, then the layers (e.g., a protective layer) between the reflective layer 14 and the microcup structure layer 131 are required to have good optical transparency. There is no such requirement if there are no other layers between the reflective layer 14 and the microcup structure layer 131. In this way, the light reflected by the reflective layer 14 can pass through the microcup structure layer 131, the pixel electrode layer 112 and the first base 111, and be perceived by the human eyes.

Figure 1B:
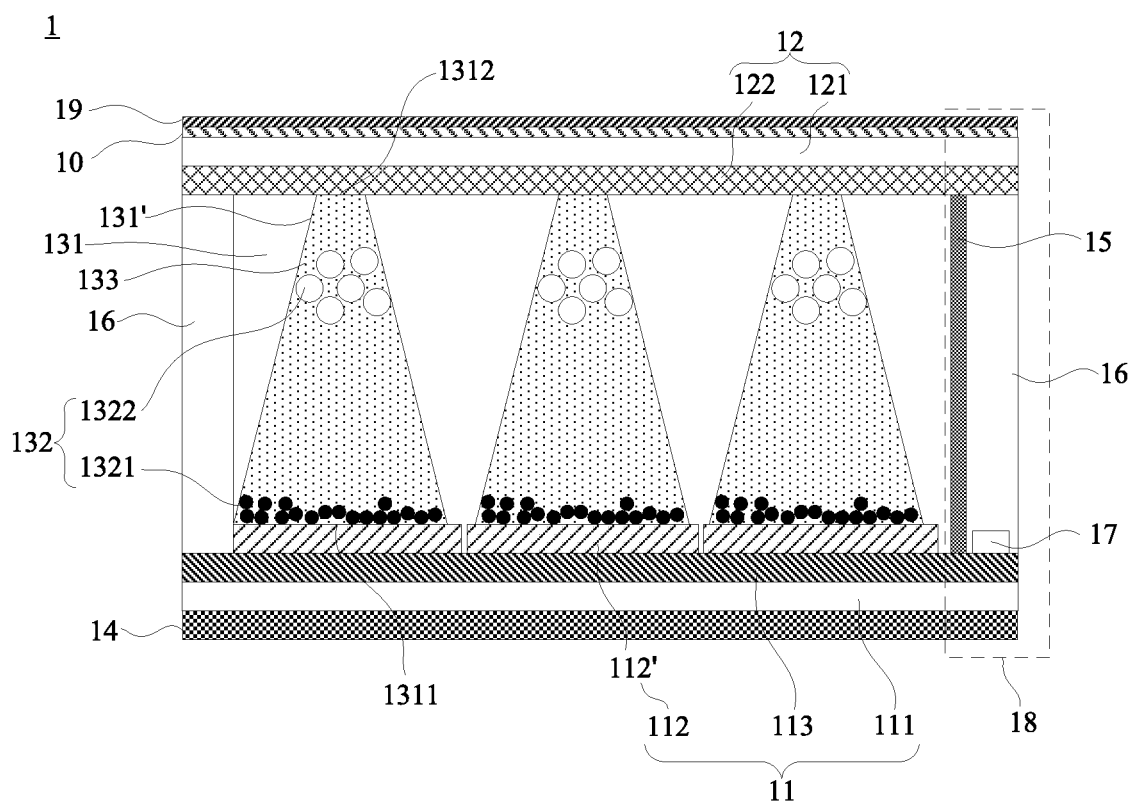
FIG. 1B is a schematic diagram showing a structure of another display substrate, in accordance with some embodiments.

For example, as shown in FIG. 1B, the second substrate 12 side of the display substrate 1 serves as the display side of the display substrate 1, and the first substrate 11 side of the display substrate 1 serves as the non-display side of the display substrate 1. In this case, both the second base 121 and the common electrode layer 122 are required to have good optical transparency to improve the light transmittance of the display substrate 1. For example, the material of the second base 121 is the glass, and the common electrode layer 122 is a transparent conductive film such as ITO formed on the second base 121 by using a process such as sputtering or evaporation. In this way, the light reflected by the charged particles 132 can pass through the second base 121 and the common electrode layer 122, and be perceived by the human eyes.

In addition, in this case, if the reflective layer 14 is mounted on the first substrate 11 side of the display substrate 1, and the reflective layer 14 is located on a side, away from the pixel electrode layer 112, of the first base 111, then the first base 111 and the pixel electrode layers 112 are both required to have good optical transparency to improve the light transmittance of the display substrate 1. For example, the material of the first base 111 is the glass, and the pixel electrode layer 112 is a transparent conductive film such as ITO formed on the first base 111 by using processes such as sputtering and evaporation. In this way, the light reflected by the reflective layer 14 can pass through the first base 111, the pixel electrode layer 112, the microcup structure layer 131, the common electrode layer 122, and the second base 121, and be perceived by the human eyes.

If the reflective layer 14 is mounted on the first substrate 11 side of the display substrate 1, and the reflective layer 14 is located on a side, facing the microcup structure layer 131, of the first base 111, then layers between the reflective layer 14 and the microcup structure layer 131 are required to have good optical transparency to improve the light transmittance of the display substrate 1. For example, if the reflective layer 14 is located between the pixel electrode layer 112 and the microcup structure layer 131, then the layers (e.g., a pla-narization layer) between the reflective layer 14 and the microcup structure layer 131 are required to have good optical transparency. There is no such requirement if there are no other layers between the reflective layer 14 and the microcup structure layer 131. In this way, the light reflected by the reflective layer 14 can pass through the microcup structure layer 131, the common electrode layer 122 and the second base 121, and be perceived by the human eyes.

In some embodiments, each microcup 131' is an accommodating cavity, and is configured to accommodate the electrophoretic fluid 133 and the charged particles 132. In some possible designs, the plurality of microcups 131' included in the microcup structure layer 131 may be formed by etching a glass substrate, or may be formed by etching other materials with good optical transparency (e.g., polyethylene terephthalate (PET)). The charged particles 132 are suspended in the electrophoretic fluid 133 to ensure that the charged particles 132 can effectively swim in the electrophoretic fluid 133.

In some embodiments, both the pixel electrode layer 112 and the common electrode layer 122 are in direct contact with the electrophoretic fluid 133, and in consideration of the light transmittance of the display substrate 1, in a case where a material of the pixel electrode layer 112 and a material of the common electrode layer 122 are transparent conductive materials such as ITO, in order to ensure that the pixel electrode layer 112 and the common electrode layer 122 are not corroded by the electrophoretic fluid 133, protective layers are disposed on a surface of the pixel electrode layer 112 in contact with the electrophoretic fluid 133 and a surface of the common electrode layer 122 in contact with the electrophoretic fluid 133. For example, materials of the protective layers include, but are not limited to, at least one of silicon dioxide ($SiO_2$), silicon nitride ($SiN_x$) and other materials with high light transmittance and performing a protective function.

Here, a minimum display unit of the display substrate 1 is a pixel corresponding to each pixel electrode 112', a pixel region corresponding to each pixel is a region determined by an orthographic projection of a corresponding pixel electrode 112' on the first base 111. There may be one or more microcups 131' in a pixel region corresponding to each pixel electrode 112'. The number of the microcup(s) 131' in a pixel region corresponding to each pixel electrode 112' may not be an integer. For example, there may be one half, one and a half, and two and a half microcups 131'. Regardless of whether there is one or more microcups 131' in a pixel region corresponding to each pixel electrode 112', and the number thereof is an integer or a non-integer, it is satisfied as long as each pixel electrode 112' is capable of driving charged particles 132 in the corresponding pixel region to swim.

Based on the above structure, when an electric field is formed between a pixel electrode 112' in the pixel electrode layer 112 and the common electrode layer 122, charged particles in a pixel region corresponding to the pixel electrode 112' can be driven to move in microcup(s) 131' where the charged particles are located, so that the charged particles 132 move to side(s), close to the pixel electrode layer 112, of the microcup(s) 131' where the charged particles are located, i.e., moving to first opening(s) 1311 of the microcup(s) 131' where the charged particles are located, so that the display substrate 1 displays a color of the charged particles 132.

By changing a direction of the electric field formed between the pixel electrode 112' and the common electrode layer 122, the charged particles 132 in the pixel region corresponding to the pixel electrode 112' can be driven to move to side(s), close to the common electrode layer 122, of the microcup(s) 131' where the charged particles 132 are located, i.e., moving to second opening(s) 1312 of the microcup(s) 131' where the charged particles 132 are located. Since a size of a first opening 1311 is greater than a size of a second opening 1312, a viewing angle at which the human eyes observe a portion of the pixel that displays the color of the charged particles 132 is small, and the portion of the pixel that displays the color of the charged particles 132 is not easily observed. Therefore, a purpose of hiding the color of the charged particles 132 is achieved, and the corresponding pixel can display or hide the color of the charged particles 132 as required.

In some embodiments, the electrophoretic fluid 133 is incorporated with charged particles of at least two colors 132, and the charged particles of the at least two colors 132 have a same electrical property, and mobilities of charged particles of different colors 132 are different.

The description that the charged particles 132 of the at least two colors have a same electrical property means that all the charged particles 132 are positively charged, or all the charged particles 132 are negatively charged. The description that mobilities of charged particles 132 of different colors are different may be interpreted as mobilities of charged particles 132 of a same color being the same, and mobilities of charged particles 132 of different colors being different. Here, the mobility refers to a rate at which the charged particles 132 migrate under an action of an unit externally applied electric field, and when a field intensity of the externally applied electric field is different, a migrating rate of the charged particles 132 is also different.

In this way, when the electric field is formed between the pixel electrode 112' in the pixel electrode layer 112 and the common electrode layer 122, the charged particles 132 in the pixel region corresponding to the pixel electrode 112' can be driven to move in the microcup(s) 131' where the charged particles are located. By adjusting a magnitude, the direction, and a duration of the electric field between the pixel electrode 112' and the common electrode layer 122, charged particles 132 with a color required to be displayed may move to side(s), close to the pixel electrode layer 112, of microcup(s) 131 where the charged particles with the color required to be displayed are located, i.e., moving to first opening(s) 1311 of the microcup(s) 131' where the charged particles with the color required to be displayed are located. Charged particles 132 of other color(s) are located on a side, away from the pixel electrode layer 112, of the charged particles 132 with the color required to be displayed, so that the corresponding pixel in the display substrate 1 displays the color required to be displayed.

Furthermore, since there are charged particles 132 with only one kind of electrical property in each microcup 131 in the microcup structure layer 131', a built-in electric field cannot be formed between charged particles 132 of different colors. Therefore, charged particles 132, away from a pixel electrode layer side, do not move to the pixel electrode side when driven by the built-in electric field, which avoids a problem that charged particles 132 at the pixel electrode layer side incorporated with the charged particles 132 away from the pixel electrode side layer, thereby eliminating an influence of the built-in electric field on the charged particles 132 at the pixel electrode layer side, and further reducing time for refreshing the display substrate 1 and reducing power consumption. Moreover, when charged particles of a plurality of colors with a single electrical property are driven, difficulty in driving the charged particles 132 may be reduced since there is no need to consider the influence of the built-in electric field.

In some embodiments, as shown in FIG. 1A, the charged particles of the at least two colors 132 include charged particles of a first color 1321 and charged particles of a second color 1322, and the charged particles of the first color have a greater specific charge than the charged particles of the second color. Here, the specific charge is a ratio of a charge amount to a mass of a charged particle.

It will be noted that, the migration rate of the charged particles 132 in the electrophoretic fluid 133 is positively correlated with intensity of an electric field in which the charged particles 132 are located and the specific charge of the charged particles 132. That is to say, in a case of a same intensity of the electric field, the greater the specific charge of the charged particles 132 is, the greater the migration rate of the charged particles 132 is, and the smaller the specific charge of the charged particles 132 is, the smaller the migration rate of the charged particles 132 is.

For example, the charged particles of the first color 1321 are black charged particles, and the charged particles of the second color 1322 are red charged particles. A specific charge of the black charged particles is greater than a specific charge of the red charged particles, which means that a migration rate of the black charged particles is greater than a migration rate of the red charged particles in the case of the same electric field intensity.

In some embodiments, a particle size of each charged particle 132 ranges from 10 nm to 100 nm. For example, in a case where the charged particles 132 of the at least two colors included in the display substrate 1 include the charged particles 1321 of the first color and the charged particles 1322 of the second color, a particle size of each charged particle 1321 of the first color is 30 nm, and a particle size of each charged particle 1322 of the second color is 80 nm.

When the charged particles 132 are driven by the electric field between the pixel electrode layer 112 and the common electrode layer 122 to move to the side(s), close to the common electrode layer 122, of the microcup(s) 131' where the charged particles are located. i.e., moving to the second opening(s) 1312 of the microcup(s) 131 where the charged particles are located, since the size of the first opening 1311 is greater than the size of the second opening 1312 of each microcup 131', the charged particles 132 moving to the second opening(s) 1312 cannot shield the second substrate 12, and in this case, the display substrate 1 is in a transparent state. If any other color layer or pattern layer is mounted on the first substrate 11 side or the second substrate 12 side of the display substrate 1, the display substrate 1 displays the color layer or pattern layer.

In some embodiments, as shown in FIGS. 1A and 18, the display substrate 1 further includes the reflective layer 14. The reflective layer 14 is disposed at a side, close to the common electrode layer 122 or the pixel electrode layer 112, of the microcup structure layer 131, and is configured to be capable of reflecting light of a set color. For example, the reflective layer 14 is a layer coated with a paint of a set color. For another example, the reflective layer 14 is a layer incorporated with the paint of the set color.

Here, in a case where the first substrate 11 side of the display substrate 1 is the display side, the reflective layer 14 is disposed at the side, close to the common electrode layer 122, of the microcup structure layer 131. That is, the reflective layer 14 is disposed between the microcup structure layer 131 and the common electrode layer 122, or the reflective layer 14 is disposed at a side, away from the microcup structure layer 131, of the common electrode layer 122.

In a case where the second substrate 12 side of the display substrate 1 is the display side, the reflective layer 14 is disposed at the side, close to the pixel electrode layer 112, of the microcup structure layer 131. That is, the reflective layer 14 is disposed between the microcup structure layer 131 and the pixel electrode layer 112, or the reflective layer 14 is disposed at a side, away from the microcup structure layer 131, of the pixel electrode layer 112.

In some possible designs, a high-brightness color is selected to be a set color of the light that can be reflected by the reflective layer 14, for example, the set color is yellow or orange. Since light reflected by the high-brightness color is easy to be seen, this enables the reflective layer 14 with the high-brightness color to produce a good reflection effect. On this basis, in a case where the charged particles 132 are used in the display substrate 1 in combination with the reflective layer 14, a low-brightness color is selected as the color of the charged particles 132. For example, the color of the charged particles 132 includes red, black, green, or purple. In this way, when the display substrate 1 displays the color of the charged particles 132, the color of the charged particles 132 can shield the color of the reflective layer 14, so as to prevent a fact that an image displayed by the display substrate 1 is incorporated with the color of the reflective layer 14 from affecting the display effect.

In the above embodiments, when the display substrate 1 is in a transparent state, it can display the color of the reflective layer 14. In this way, without increasing a color type of the charged particles 132, at least one color that can be displayed by the display substrate 1 is increased, thereby enabling the display substrate 1 to display images with complex colors.

In some embodiments, an orthographic projection of the second opening 1312 of each microcup 131' in the microcup structure layer 131 on the second substrate 12 has a shape of a closed figure, and a distance from any point on a boundary of the closed figure to any other point on the boundary is less than or equal to a limit resolution size of the human eyes.

Here, the closed figure may be, for example, a circle, a triangle, a square or a figure with any other shape, and the closed figure may also be a plane figure defined by irregular curves.

The limit resolution size of the human eyes means a limit size, for objects of different sizes, between a distinguishable limit and an indistinguishable limit when the human eyes observe the objects of different sizes. When a size of an object is less than or equal to the limit size, the human eyes cannot distinguish or can hardly distinguish the object.

In this way, when the charged particles 132 are driven by the electric field formed between the pixel electrode layer 112 and the common electrode layer 122 to move to the side(s), close to the common electrode layer 122, of the microcup(s) 131' where the charged particles are located, i.e., moving to the second opening(s) 1312 of the microcup(s) 131' where the charged particles are located, the human eyes cannot observe or can hardly observe the color displayed by the charged particles 132. Therefore, the display substrate 1 is in the transparent state, or in a case where the display substrate 1 includes the reflective layer 14, the display substrate 1 displays the color of the reflective layer 14.

In order to prevent transmission of the color of the reflective layer by a gap between first openings 1311 of two adjacent microcups 13 from affecting the color required to be displayed by the display substrate 1, in some embodiments, a width of a gap between orthographic projections of the first openings 1311 of the two adjacent microcups 13 on the first substrate 11 is less than or equal to the limit resolution size of the human eyes. In this way, the human eyes cannot observe or can hardly observe the color of the reflective layer transmitted by the gap between the first openings 1311 of the two adjacent microcups 13, thereby preventing the color of the reflective layer from affecting the color required to be displayed by the display substrate 1.

Generally, the limit resolution size of the human eyes is approximately 15 μm. Therefore, for example, the distance from any point on the boundary of the closed figure to any other point on the boundary is less than or equal to 15 μm, and the width of the gap between the orthographic projections of the first openings 1311 of the two adjacent microcups 131' on the first substrate 11 is less than or equal to 15 μm. In this way, when the charged particles 132 are driven by the electric field formed between the pixel electrode layer 112 and the common electrode layer 122 to move to the side(s), close to the common electrode layer 122, of the microcup(s) 131' where the charged particles are located. i.e., moving to the second opening(s) 1312 of the microcup(s) 131' where the charged particles are located, the size of the second opening 1312 ensures that the human eyes cannot observe or can hardly observe the color displayed by the charged particles 132, and the color required to be displayed by the display substrate 1 is not affected by the color of the reflective layer transmitted by the gap between the first openings 1311 of the two adjacent microcups 13.

In some embodiments, a shape of each microcup 131' is a truncated pyramid or a truncated cone. A truncated pyramid refers to a geometric body between a cross section and a bottom face of a pyramid after the pyramid is truncated by a plane parallel to the bottom face of the pyramid. Two bottom faces of the truncated pyramid are two similar polygons, and side faces thereof are composed of a plurality of trapezoids. When the shape of each microcup 131' is a triangular truncated pyramid, shapes of the first opening 1311 and the second opening 1312 of each microcup 131' are triangles. When the shape of each microcup 131' is a hexagonal truncated pyramid, the shapes of the first opening 1311 and the second opening 1312 of each microcup 131' are hexagons.

A truncated cone refers to a geometric body between a cross section and a bottom face of a cone after the cone is truncated by a plane parallel to the bottom face of the cone. When the shape of each microcup 131' is the truncated cone, the shapes of the first opening 1311 and the second opening 1312 of each microcup 131' are circles.

Figure 2A:
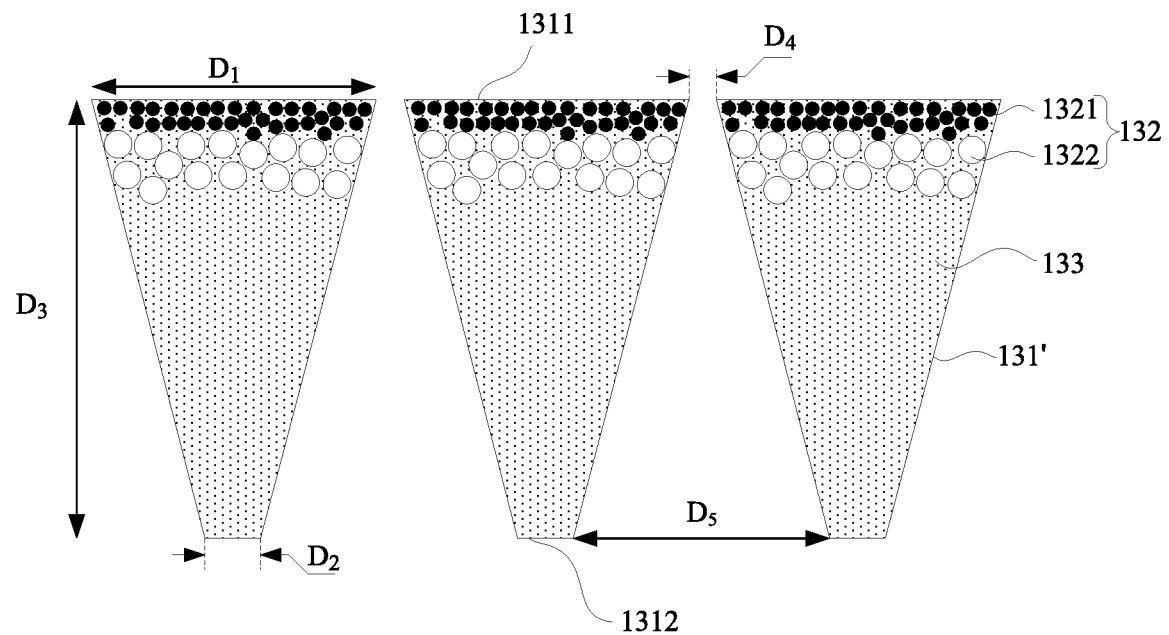
FIG. 2A is a schematic front view of structures of a plurality of microcups in a display substrate, in accordance with some embodiments.
Figure 2B:
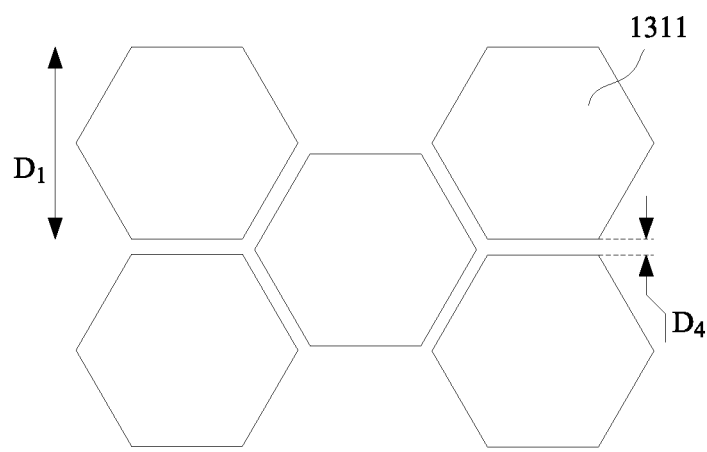
FIG. 2B and is a schematic top view of structures of a plurality of microcups in a display substrate, in accordance with some embodiments.
Figure 2C:
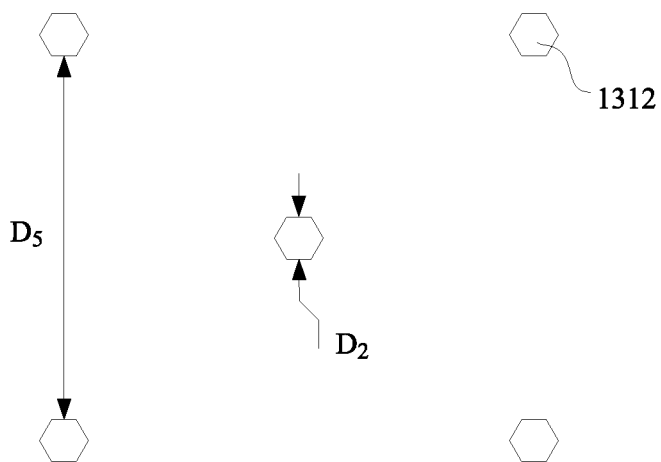
FIG. 2C is a schematic bottom view of structures of a plurality of microcups in a display substrate, in accordance with some embodiments.

For example, as shown in FIGS. 2A, 2B and 2C, the shape of each microcup 131' is a regular hexagonal truncated pyramid. That is, a plane defined by the first opening 1311 and a plane defined by the second opening 1312 of each microcup 131' are the two bottom faces of the regular hexagonal truncated pyramid, and the two planes are parallel to each other, and the shape of the first opening 1311 and the shape of the second opening 1312 are both regular hexagons. Each microcup 131' includes six side faces, shapes of which are same isosceles trapezoids. With this arrangement, force to which each microcup 131' is subjected is uniform and each microcup 131' has good stability.

In some possible designs, as shown in FIG. 2B, a shortest distance $D_1$ between two opposite sides of the first opening 1311 of each microcup 131' ranges from 140 μm to 160 μm. In this way, the size of the first opening 1311 can meet a requirement of a high pixels per inch (PPI).

In some possible designs, as shown in FIGS. 2B and 2C, in orthographic projections of the plurality of microcups 131' on the first substrate 11, the width $D_4$ of the gap between the orthographic projections of the first openings 1311 of the two adjacent microcups 131' ranges from 12 µm to 15 µm, and a width $D_5$ of a gap between orthographic projections of second openings 1312 of two adjacent microcups 131' ranges from 140 µm to 160 µm. In this way, centers of the orthographic projections of the first opening 1311 and the second opening 1312 of each microcup 131' coincide with each other, which ensures that the shape of each microcup 131' is a regular truncated pyramid, so that force to which each part of each microcup 131' is subjected is uniform. Moreover, the width $D_4$ of the gap between the orthographic projections of the first openings 1311 of the two adjacent microcups 131' ranges from 12 µm to 15 µm, which can ensure that the gap between the first openings 1311 of the two adjacent microcups 131' is not perceived or is hardly perceived by the human eyes.

In some embodiments, as shown in FIGS. 2A, 2B and 2C, the shape of the plurality of microcups 131' is the regular hexagonal truncated pyramid, the shortest distance $D_1$ between the two opposite sides of the first opening 1311 of each microcup 131' is 150 µm, and a shortest distance $D_2$ between two opposite sides of the second opening 1312 of each microcup 131' is 15 µm. A size $D_3$ of each microcup 131' in a direction perpendicular to the first substrate 11 is 150 µm. In the orthographic projections of the plurality of microcups 131' on the first substrate 11, the width $D_4$ of the gap between the orthographic projections of the first openings 1311 of the two adjacent microcups 131' is 15 µm, and the width $D_5$ of the gap between the orthographic projections of the second openings 1312 of the two adjacent microcups 131' is 150 µm.

In some possible designs, as shown in FIG. 2A, the size $D_3$ of each microcup 131' in the direction perpendicular to the first substrate 11 ranges from 140 µm to 160 µm, and the size is also a maximum migration distance of the charged particles 132 between the first opening 1311 and the second opening 1312 of each microcup 131'. This size range can ensure that the charged particles 132 have a sufficient migration distance, so that the charged particles 132 of different colors can be adequately stratified, and then the display substrate 1 displays different colors. Moreover, this size range will not cause the display substrate 1 to be too thick due to an excessively large size of the microcup structure layer 131 in the direction perpendicular to the first substrate 11, thereby meeting a demand for a thin and light display substrate 1.

Figure 3A:
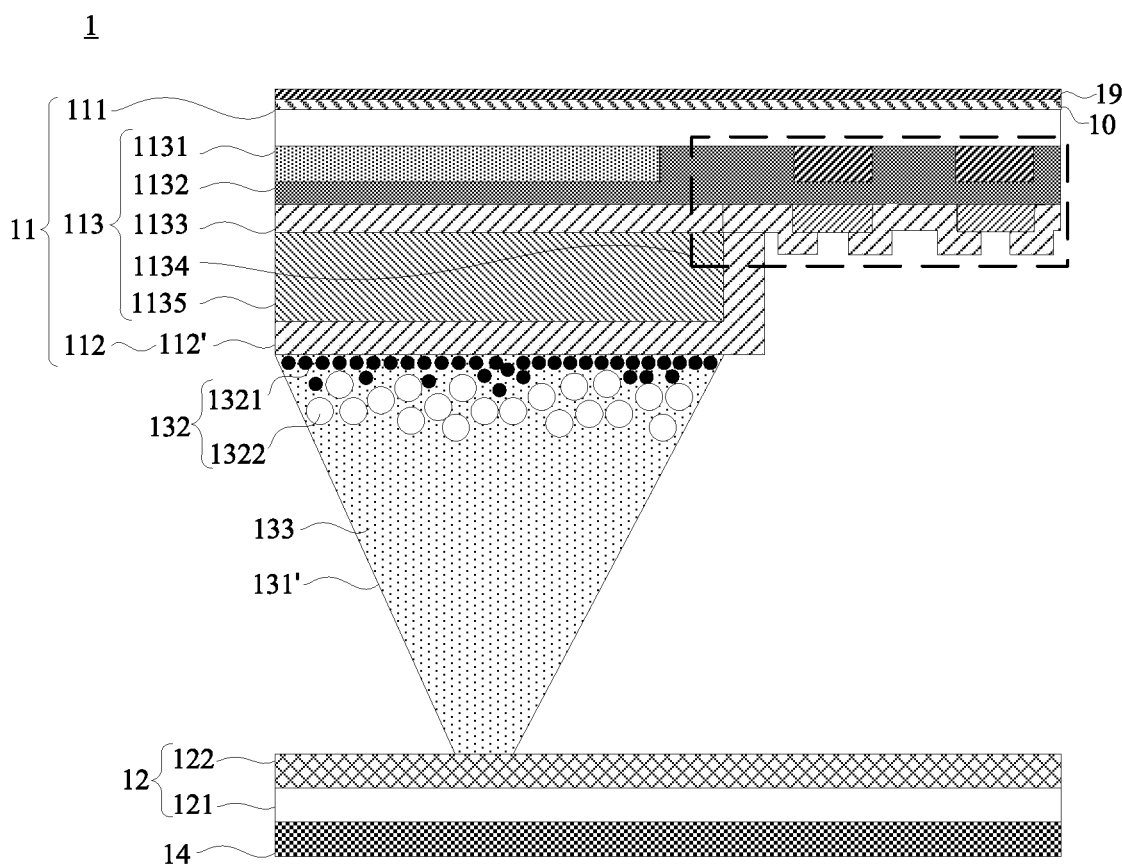
FIG. 3A is a schematic diagram showing a structure of yet another display substrate, in accordance with some embodiments.
Figure 3B:
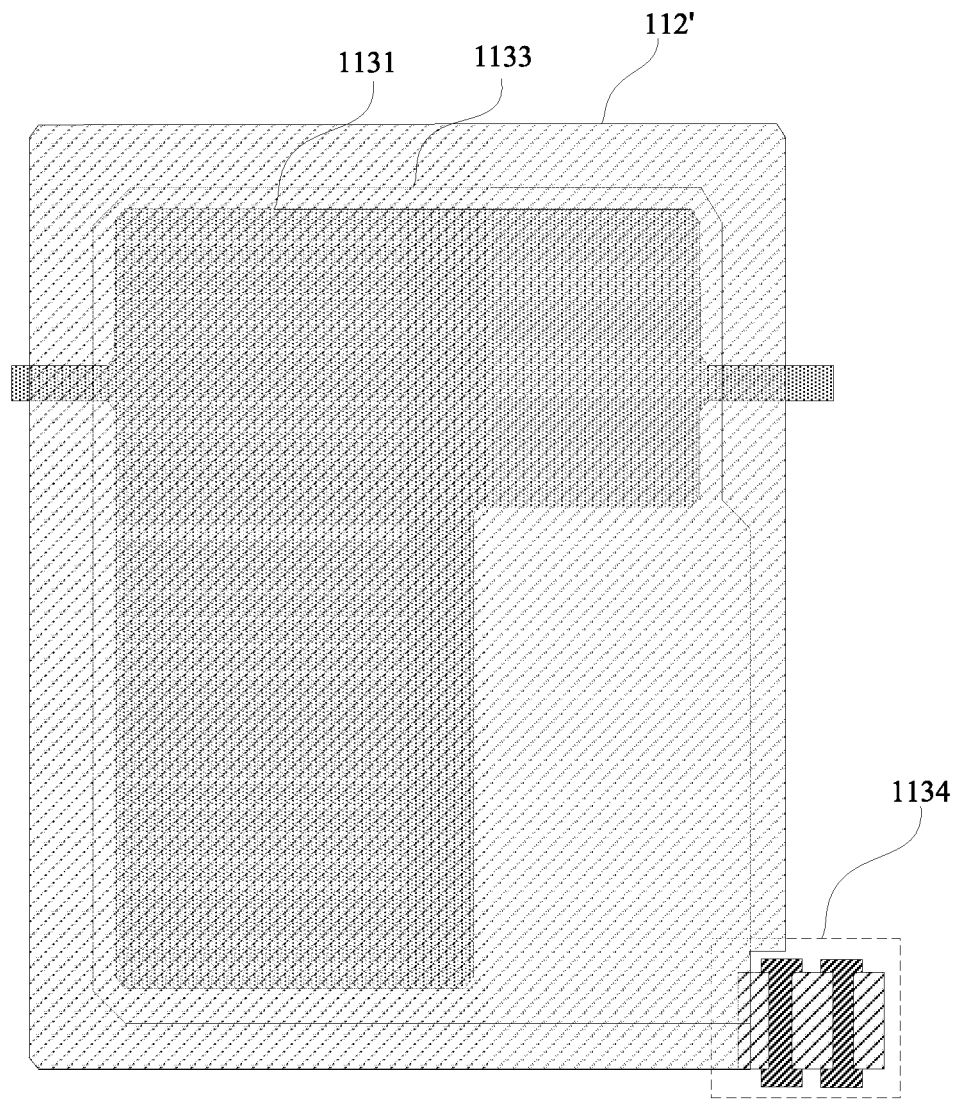
FIG. 3B is a schematic bottom view of a structure of a pixel in a display substrate, in accordance with some embodiments.

In some embodiments, as shown in FIGS. 3A and 3B, the first substrate 11 further includes an active device layer 113, which is disposed between the first base 111 and the pixel electrode layer 112.

The active device layer 113 includes a plurality of driving switch transistors 1134, a plurality of transparent first storage capacitor electrodes 1133, and a plurality of transparent second storage capacitor electrodes 1131. Each driving switch transistor 1134 is, for example, a thin film transistor (TFT), and each driving switch transistor 1134 is electrically connected to a corresponding pixel electrode 112' in the pixel electrode layer 112. For example, a drain of each driving switch transistor 1134 is electrically connected to a corresponding pixel electrode 112', and each driving switch transistor 1134 is configured to drive a pixel electrode 112' electrically connected thereto.

When the charged particles 132 of a plurality of colors with a single electrical property are driven, the difficulty in driving the charged particles 132 is reduced since there is no need to consider the influence of the built-in electric field. Therefore, performance requirements for the plurality of driving switch transistors 1134 can also be reduced accordingly, which enables a size of each driving switch transistor 1134 to be reduced, so that a light-shielding area of each driving switch transistor 1134 can be reduced, which facilitates to improve the light transmittance of the display substrate 1.

Figure 4A:
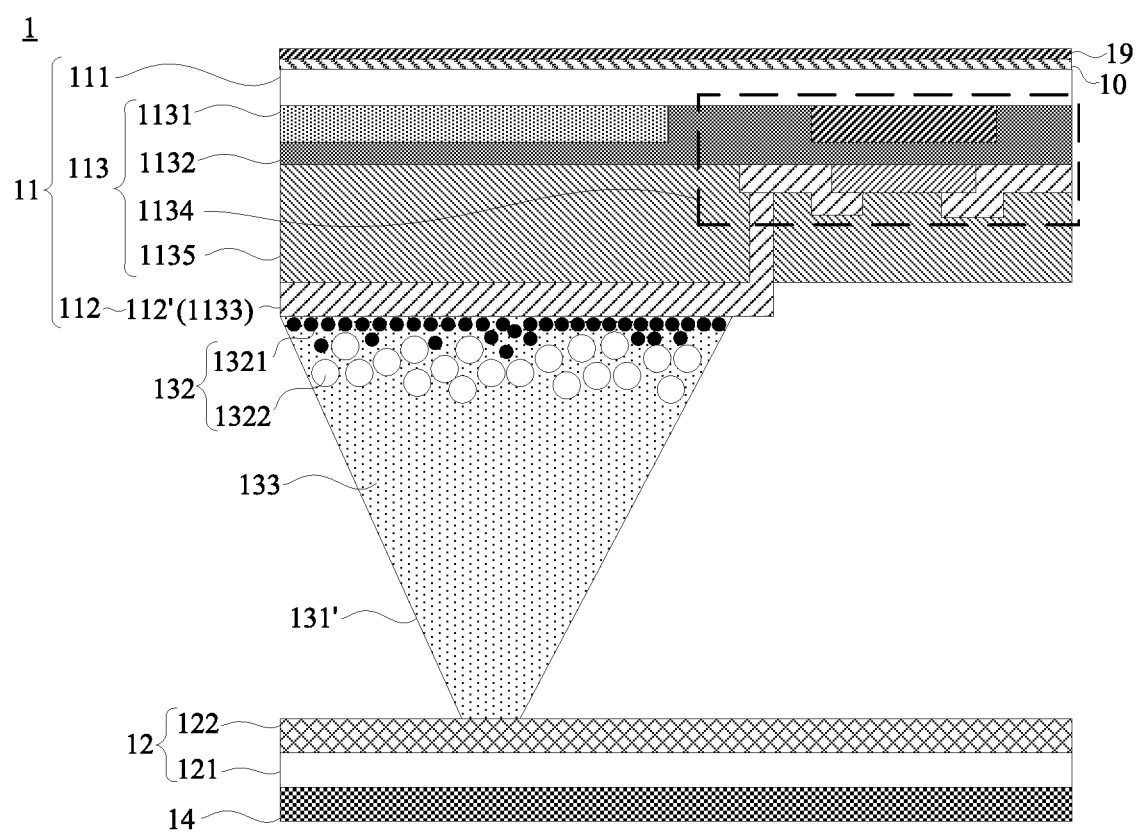
FIG. 4A is a schematic diagram showing a structure of yet another display substrate, in accordance with some embodiments.
Figure 4B:
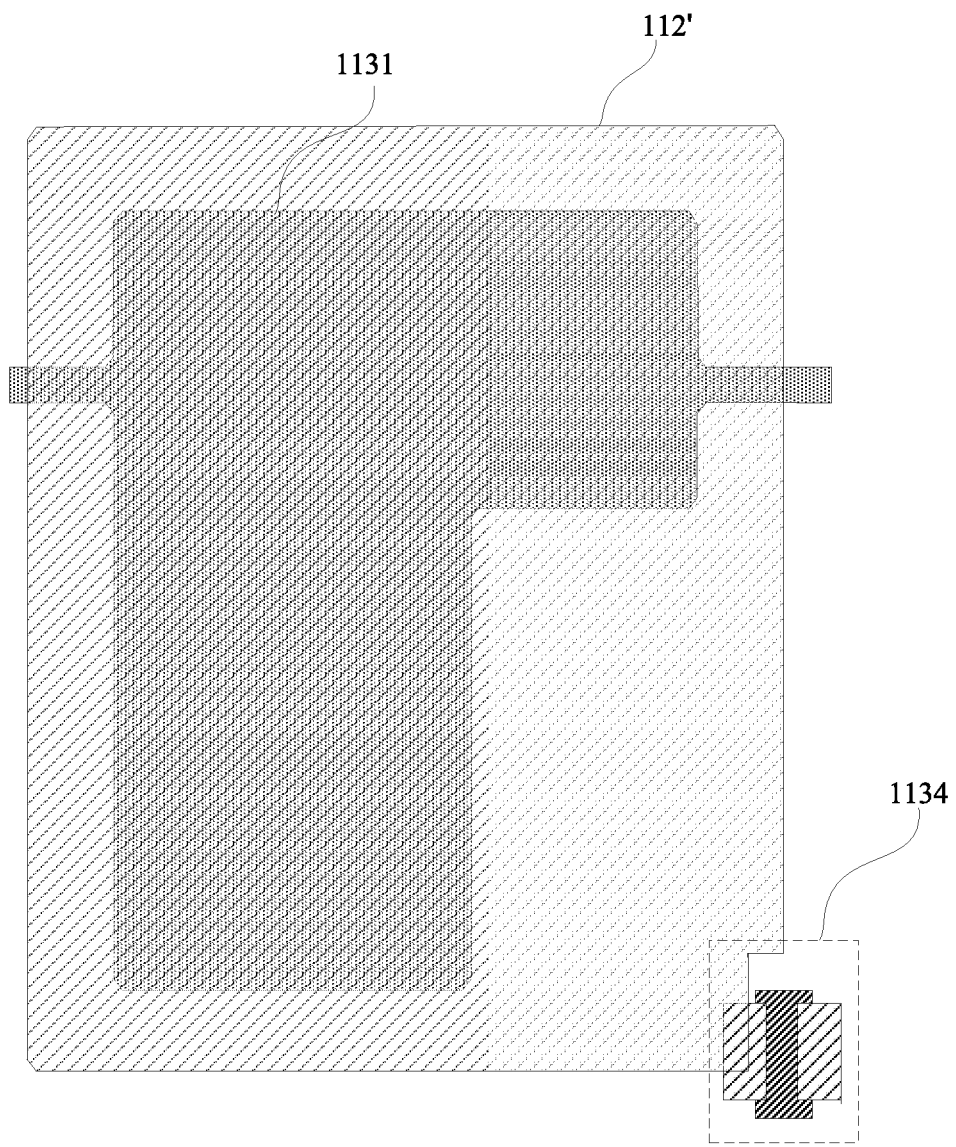
FIG. 4B is another schematic bottom view of a structure of a pixel in a display substrate, in accordance with some embodiments.

For example, as shown in FIGS. 4A and 4B, each driving switch transistor 1134 is a single-gate thin film transistor (a thin film transistor with one gate). In this way, an orthographic projection of the driving switch transistor 1134 on the first base 111 is small, thereby reducing influence of each driving switch transistor 1134 on display of the display substrate 1.

For example, as shown in FIGS. 3A and 3B, each driving switch transistor 1134 is a double-gate thin film transistor (a thin film transistor with two gates). In this way, after each driving switch transistor 1134 is turned off, influence of leakage current on the pixel electrode 112' may be reduced.

In some possible designs, the orthographic projection of each driving switch 1134 on the first base 111 is within a rectangle with a length of 20 µm and a width of 15 µm. Since the limit resolution size of the human eyes is generally approximately 15 µm, with the orthographic projection within the above size range, each driving switch transistor 1134 is invisible or almost invisible to the human eyes, thereby ensuring that each driving switch transistor 1134 does not affect the display of the display substrate 1.

The plurality of transparent first storage capacitor electrodes 1133 are electrically connected to the plurality of driving switch transistors 1134. For example, each first storage capacitor electrode 1133 is electrically connected to a drain of a corresponding driving switch transistor. Therefore, an electrical signal from each first storage capacitor electrode 1133 is the same as an electrical signal from a pixel electrode 112' corresponding to a corresponding driving switch transistor 1134.

A position of a layer in which the plurality of first storage capacitor electrodes 1133 are located is not limited in the embodiments of the present disclosure. For example, as shown in FIG. 3A, the plurality of first storage capacitor electrodes 1133 and the plurality of pixel electrodes 112' in the pixel electrode layer 112 are disposed in different layers. For example, the plurality of first storage capacitor electrodes 1133 may be disposed on a side, facing the first base 111, of the pixel electrode layer 112, and the first storage capacitor electrodes 1133 are separated from the pixel electrode layer 112 by an insulating layer 1135.

For example, as shown in FIG. 4A, the plurality of first storage capacitor electrodes 1133 and the plurality of pixel electrodes 112' in the pixel electrode layer 112 are disposed in a same layer.

For example, the plurality of first storage capacitor electrodes 1133 and the plurality of pixel electrodes 112' are independent electrodes separated from each other, and each first storage capacitor electrode 1133 is directly electrically connected to a corresponding driving switch transistor 1134. Or, each first storage capacitor electrode 1133 is electrically connected to a corresponding pixel electrode 112' through a connecting line, so that each first storage capacitor electrode 1133 is indirectly electrically connected to a corresponding driving switch transistor 1134 through the corresponding pixel electrodes 112'.

For another example, as shown in FIG. 4A, each first storage capacitor electrode 1133 and a corresponding pixel electrode 112' form an integrated structure. It may further be considered that, each pixel electrode 112' extends to a region where a corresponding first storage capacitor electrode 1133 is to be formed, and an extension portion serves as the corresponding first storage capacitor electrode 1133. This is equivalent to each pixel electrode 112' further having a function of a corresponding first storage capacitor electrode 1133, which facilitates to simplify manufacturing processes of the display substrate 1.

As shown in FIGS. 3A and 4A, the plurality of transparent second storage capacitor electrode 1131 correspond to the plurality of transparent first storage capacitor electrode 1133, and there is an overlapping region between an orthographic projection of a first storage capacitor electrode 1133 on the first base 111 and an orthographic projection of a corresponding second storage capacitor electrode 1131 on the first base 111. In this way, a storage capacitor can be formed between a first storage capacitor electrode 1133 and a corresponding second storage capacitor electrode 1131.

The plurality of second storage capacitor electrode 1131 are disposed on a side, close to the plurality of first storage capacitor electrodes 1133, of the first base 111, and each second storage capacitor electrode 1131 is grounded or electrically connected to a common voltage terminal. In this way, in a first storage capacitor electrode 1133 and a corresponding second storage capacitor electrode 1131, a voltage of the first storage capacitor electrode 1133 is a pixel voltage of a corresponding pixel electrode 112', and a voltage of the corresponding second storage capacitor electrode 1131 is a ground voltage or a common voltage, thereby forming a storage capacitor between the first storage capacitor electrode 1133 and the corresponding second storage capacitor electrode 1131.

It will be noted that, in some embodiments, the first substrate 11 further includes a first insulating layer 1132 disposed between the plurality of first storage capacitor electrode 1133 and the plurality of second storage capacitor electrodes 1131, so that the plurality of first storage capacitor electrodes 1133 are electrically insulated from the plurality of second storage capacitor electrodes 1131.

In some embodiments, each driving switch transistor 1134 included in the active device layer 113 includes a gate, a source, and a drain. The gate, the source, and the drain are made of a transparent conductive material, so that each driving switch transistor 1134 becomes transparent, and the light transmittance of the display substrate 1 is increased. For example, the transparent conductive material that the gate, the source and the drain of each driving switch transistor 1134 are made of may be a transparent metal oxide conductive material, such as ITO or indium zinc oxide (IZO).

In some possible designs, the gate, the source and the drain of each driving switch transistor 1134 may be made of a same transparent conductive material as the plurality of first storage capacitor electrodes 1133 and the plurality of second storage capacitor electrodes 1131, such as ITO or IZO.

In some possible designs, as shown in FIGS. 3A and 4A, the gate of each driving switch transistor 1134 is disposed on the first base 111, and is disposed in a same layer as a corresponding second storage capacitor electrode 1131, and both are made of the same transparent conductive material, which enables the gate of each driving switch transistor 1134 and a corresponding second storage capacitor electrode 1131 to be formed in a same process.

In some other possible designs, as shown in FIG. 3, each first storage capacitor electrode 1133 is disposed in a same layer as the drain and the source of a corresponding driving switch transistor 1134, and they are all made of the same transparent conductive material, which enables the drain and the source of each driving switch transistor 1134 and the first storage capacitor electrode 1133 corresponding to the drain to be formed in a same process, thereby simplifying the manufacturing processes.

In some embodiments, as shown in FIGS. 1A and 1B, the display substrate 1 further includes a conductive component 15. The conductive component 15 is disposed on an outer side of the microcup structure layer 131, an end of the conductive component 15 is electrically connected to the common electrode layer 122 of the second substrate 12, and the other end is electrically connected to the plurality of second storage capacitor electrode 1131 of the first substrate 11. In this way, by only providing a port for receiving the common voltage on the first substrate 11, a common voltage signal provided by an outside of the display substrate 1 is transmitted to the plurality of second storage capacitor electrode 1131 of the first substrate 11 through the port, and the common voltage signal can be transmitted to the common electrode layer 122 of the second substrate 12 through the conductive component 15. Therefore, without a need to provide the port for receiving the common voltage on the second substrate 12, the common voltage can be transmitted to the common electrode layer 122 of the second substrate 12, thereby simplifying a structure of the second substrate 12. For example, a material of the conductive component 15 includes a conductive adhesive.

In some embodiments, as shown in FIGS. 1A and 1B, the display substrate 1 further includes a frame sealant 16. The frame sealant 16 is disposed between the first substrate 11 and the second substrate 12, and surrounds the microcup structure layer 131. In this way, the frame sealant 16 can bond the first substrate 11 and the second substrate 12 together to seal the micro-cup structure layer 131 between the first substrate 11 and the second substrate 12, thereby protecting the micro-cup structure layer 131, and preventing the micro-cup structure layer 131 from being corroded by external moisture and being oxided by external air. For example, the frame sealant 16 is located on the outer side of the microcup structure layer 131 and surrounds the microcup structure layer 131 to form a frame-shaped structure.

In a case where the display substrate further includes the conductive component 15, the conductive component 15 is located on a side, close to the microcup structure layer 131, of the frame sealant 16. Further, in a case where the frame sealant 16 is formed into the frame-shaped structure, the conductive component 15 is located inside the frame-shaped structure formed by the frame sealant 16. In this way, the conductive component 15 is encapsulated inside the display substrate 1 by the frame sealant 16, which serves to protect the conductive component 15.

In some embodiments, as shown in FIGS. 1A and 1B, the display substrate 1 further includes a control chip 17. The control chip 17 is disposed in a frame region 18 at a side, facing the second substrate 12, of the first substrate 11 (the region shown by the dotted box 18 in FIG. 1), and is encapsulated in the frame sealant 16. The control chip 17 is electrically connected to the active device layer 113 of the first substrate 11 to transmit control signals to the plurality of driving switch transistors 1134 in the active device layer 113, so that the plurality of driving switch transistors 1134 drive the corresponding pixel electrodes 112'. In the case where the display substrate further includes the conductive component 15, the control chip 17 is further electrically connected to the conductive component 15 to transmit the common voltage to the common electrode layer 122 of the second substrate 12 through the conductive component 15.

In some embodiments, the display substrate 1 further includes a flexible printed circuit (FPC for short), the FPC is electrically connected to the control chip 17 and is configured to output a data signal and a working voltage to the control chip 17. The data signal is a signal for controlling a voltage of each pixel electrode 112 in the display substrate 1, and the working voltage is a working voltage of the control chip 17.

In some embodiments, as shown in FIGS. 1A, 18, 3A, 4A, 5, 6 and 7, the display substrate 1 further includes a protective layer 19 and an adhesive layer 10. The protective layer 19 is configured to separate the substrate on the display side of the display substrate 1 (i.e., the first substrate 11 or the second substrate 12) from moisture and oxygen in the air, so as to prevent the moisture and oxygen in the air from corroding and oxidizing the substrate on the display side of the display substrate 1. The adhesive layer 10 is configured to bond the protective layer 19 and the first substrate 11 together.

It will be noted that, since the protective layer 19 and the adhesive layer 10 are disposed on the display side of the display substrate 1, the protective layer 19 and the adhesive layer 10 are required to have good optical transparency. For example, a material of the protective layer 19 may be polystyrene (PS for short), and a material of the adhesive layer 10 may be an optically clear adhesive (OCA for short).

As shown in FIG. 12, some embodiments of the present disclosure provide a display device 100, and the display device 100 includes the display substrate 1 described in the above embodiments.

The display substrate 1 included in the display device 100 includes the microstructure layer 131 having the plurality of microcups 131', and each microcup 131' contains an electrophoretic fluid 133 incorporated with charged particles 132. In this way, by driving the charged particles 132 to swim in the microcups 131' where the charged particles are located, an image may be displayed.

For example, the display device 100 includes an e-book reader, an electronic tag in a shopping mall, an advertisement display board, an electronic signboard, an intelligent terminal with a display function and other products or components with the display function.

On this basis, by providing the charged particles 132 with only one kind of electrical property in each microcup 131' in the microcup structure layer 131 of the display substrate 1 in the display device 100, the built-in electric field cannot be formed between the charged particles 132, thereby eliminating an influence of charged particles 132 at the non-display side on charged particles 132 at the display side in the built-in electric field, reducing the time for refreshing the display substrate 1 and reducing the power consumption. Furthermore, when the charged particles of a plurality of colors with a single electrical property are derived, the difficulty in driving the charged particles 132 is also reduced since there is no need to consider the influence of the built-in electric field.

Some embodiments of the present disclosure provide a method for driving a display substrate 1, and the method is configured to drive the display substrate 1 described in some embodiments described above. The display substrate 1 has charged particles 132 of at least two colors, and thus the display substrate 1 has ink state modes of at least two colors.

For an ink state mode of each color in the ink state modes of the at least two colors, as shown in FIGS. 3A, 4A, 5 and 8, the method for driving the display substrate 1 includes S100 to S200.

In S100, a pixel voltage signal is transmitted to a pixel electrode 112' corresponding to a pixel that is to display a target color in the display substrate 1, and a common voltage signal is transmitted to the common electrode layer 122 of the display substrate 1, so that a target voltage with a target value and a target polarity is generated between the pixel electrode 112' and the common electrode layer 122.

In S200, charged particles 132 in a region of the pixel to display the target color are driven by an electric field formed by the target voltage to swim for a target time, so that charged particles 132 of the target color are closer to first opening(s) 1311 of microcup(s) 131' where the charged particles are located than the charged particles of the other color(s) 132.

The target value, the target polarity, and the target time are an absolute value, a polarity and a duration of a voltage required to enter an ink state mode of the target color, determined according to a difference in the mobilities of the charged particles 132 of different colors in the display substrate 1. Here, the target value is an absolute value of a magnitude of the target voltage, the target time is a duration of the target voltage, and the target polarity is a polarity of the target voltage, that is, the target voltage is positive or the target voltage is negative.

It will be noted that, the positive polarity and the negative polarity mentioned in the embodiments of the present disclosure are described with reference to a potential of the common voltage signal applied to the common electrode layer 122. If a difference between a potential at the pixel electrode 112' and the potential at the common electrode layer 122 is positive, the target voltage is positive. If the difference between the potential at the pixel electrode 112' and the potential at the common electrode layer 122 is negative, the target voltage is negative.

Based on the structure of the display substrate 1, it will be seen that, by controlling the difference between the potential at the pixel electrode layer 112 and the potential at the common electrode layer 122 to form different electric fields, when the electric field is formed between the pixel electrode 112' in the pixel electrode layer 112 and the common electrode layer 122, the charged particles 132 in the pixel region corresponding to the pixel electrode 112' can be driven to swim in the microcup(s) 131' where the charged particles are located. By adjusting the magnitude, the direction and the duration of the electric field between the pixel electrode 112' and the common electrode layer 122, the charged particles 132 with the color required to be displayed can move to the side(s), close to the pixel electrode layer 112, of the microcup(s) 131 where the charged particles are located, i.e., moving to the first opening(s) 1311 of the microcup(s) 131' where the charged particles are located, and the charged particles 132 of the other color(s) are located on the side, away from the pixel electrode layer 112, of the charged particles 132 with the color required to be displayed, so that the pixel corresponding to the pixel electrode 112' displays the color required to be displayed.

On this basis, when the pixel corresponding to the pixel electrode 112' in the pixel electrode layer 112 displays the color required to be displayed, since there are the charged particles 132 with only one kind of electrical property in each microcup 131' in the microcup structure layer 131, the built-in electric field cannot be formed between the charged particles of different colors 132, thereby eliminating an influence of the built-in electric field on the charged particles 132 at the display side, reducing the refresh time and reducing the power consumption.

Figure 5:
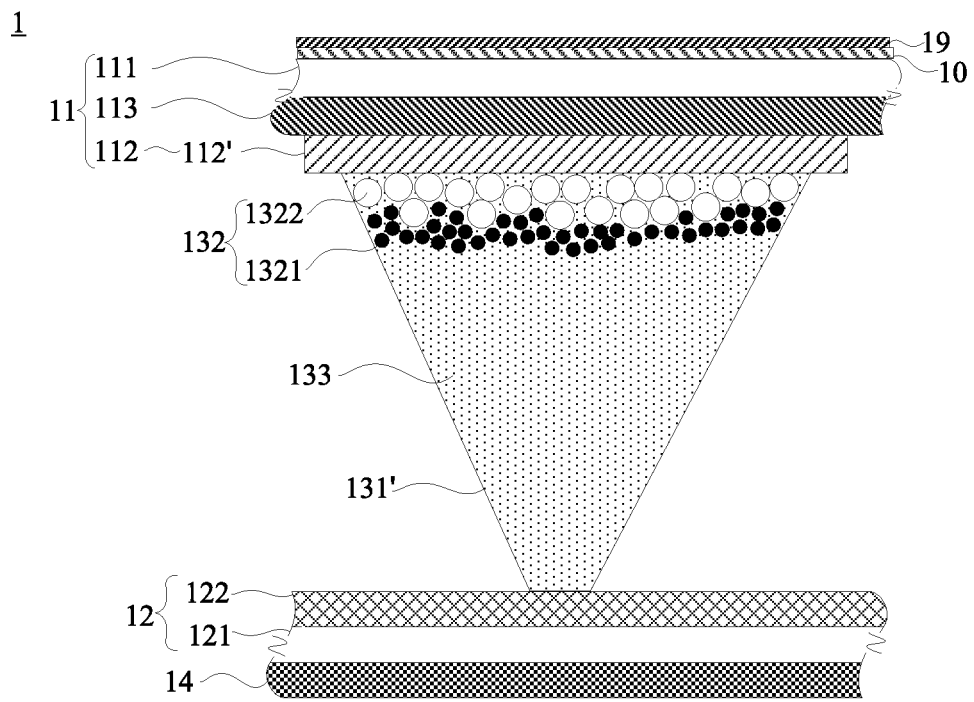
FIG. 5 is a schematic diagram showing a structure of a display substrate in a display state, in accordance with some embodiments.

As shown in FIGS. 3A, 4A and 5, in some embodiments, the display substrate 1 includes the charged particles 1321 of the first color and the charged particles 1322 of the second color, a mobility of the charged particles 1321 of the first color is greater than a mobility of the charged particles 1322 of the second color. Correspondingly, the display substrate 1 has an ink state mode of the first color and an ink state mode of the second color. The charged particles 1321 of the first color and the charged particles 1322 of the second color are both positively charged particles, or are both negatively charged particles.

For example, the charged particles of the first color 1321 include the black charged particles, and the charged particles of the second color 1322 include the red charged particles, and the mobility of the black charged particles is greater than the mobility of the red charged particles. Correspondingly, the display substrate 1 has a black ink state mode (i.e., the ink state mode of the first color) and a red ink state mode (i.e., the ink state mode of the second color). The black charged particles and the red charged particles are both positively charged particles, or are both negatively charged particles.

In some embodiments, as shown in FIGS. 3A, 4A and 9, for the ink state mode of the first color, the method for driving the display substrate 1 includes S110 to S210.

In S110, a first pixel voltage signal is transmitted to a pixel electrode 112' corresponding to a pixel that is to display the first color, and a common voltage signal is transmitted to the common electrode layer 122, so that a first target voltage with a first target value and a first target polarity is generated between the pixel electrode 112' and the common electrode layer 122.

In S110, the first target polarity is opposite to a polarity of the charged particles 132, so that an electric field formed by the first target voltage with the first target polarity can drive the charged particles 132 to move to the first opening(s) 1311 of the microcup(s) 131' where the charged particles are located.

In S210, charged particles in a region of the pixel to display the first color are driven by the electric field formed by the first target voltage to swim to first opening(s) 1311 of microcup(s) 131' where the charged particles are located for a first target time, so that the charged particles of the first color 1321 are closer to the first opening(s) 1311 of the microcup(s) 131' where the charged particles are located than the charged particles of the second color 1322.

In S210, since the mobility of the charged particles of the first color 1321 is greater than the mobility of the charged particles of the second color 1322, when driven by the electric field formed by the first target voltage, the charged particles of the first color 1321 reach the first opening(s) 1311 of the microcup(s) 131' where the charged particles are located earlier than the charged particles of the second color 1322, so that the pixel to display the first color displays the first color.

For example, the charged particles of the first color 1321 include the black charged particles, the charged particles of the second color 1322 include the red charged particles, and the mobility of the black charged particles is greater than the mobility of the red charged particles. The ink state mode of the first color of the display substrate 1 is the black ink state mode. Both the black charged particles and the red charged particles are positively charged. As shown in FIGS. 3A and 4A, if the display substrate 1 is to display the black color, the method for driving the display substrate 1 includes the following steps.

A first pixel voltage signal (a potential of which is, for example, −15V) is transmitted to a pixel electrode 112' corresponding to a pixel that is to display the black color, and a common voltage signal (a potential of which is, for example, a ground potential, i.e., a potential of zero) is transmitted to the common electrode layer 122, so that a first target voltage with a first target value (15V) and a first target polarity (the negative polarity) is generated between the pixel electrode 112' and the common electrode layer 122.

An electric field is formed by using the first target voltage. In this case, a direction of an electric field line is directed from the common electrode layer 122 to the pixel electrode 112', and charged particles 132 in a region of the pixel to display the black color are driven by an electric field force to swim to first opening(s) 1311 of microcup(s) 131' where the charged particles are located for a first target time (e.g., 320 ms). Since the mobility of black charged particles is greater than the mobility of the red charged particles, under action of a same electric field force, the black charged particles reach the first opening(s) 1311 of the microcup(s) 131' where the charged particles are located earlier than the red charged particles, so that the black charged particles are closer to the first opening(s) 1311 of the microcup(s) 131' than the red charged particles 131'. In this case, the corresponding pixel displays the black color.

In some embodiments, as shown in FIGS. 5 and 10, for the ink state mode of the second color, the method for driving the display substrate 1 includes a plurality of driving cycles, and each driving cycle includes S120, S220, S130 and S230.

In S120, a second pixel voltage signal is transmitted to a pixel electrode 112' corresponding to a pixel to display the second color, and a common voltage signal is transmitted to the common electrode layer 122, so that a second target voltage with a second target value and a second target polarity is generated between the pixel electrode 112' and the common electrode layer 122.

In S120, the second target polarity is the same as the polarity of the charged particles, so that an electric field formed by the second target voltage with the second target polarity can drive the charged particles 132 to move to the second opening(s) 1312 of the corresponding microcup(s) 131'.

In S220, charged particles in a region of the pixel to display the second color are driven by the electric field formed by the second target voltage to swim to second opening(s) 1312 of microcup(s) 131' where the charged particles are located for a second target time, so that the charged particles 1321 of the first color and the charged particles 1322 of the second color are stratified, and the charged particles 1321 of the first color are closer to the second opening(s) 1312 of the microcup(s) 131' where the charged particles are located than the charged particles 1322 of the second color.

In S220, since the mobility of the charged particles 1321 of the first color is greater than the mobility of the charged particles 1322 of the second color, when driven by the electric field formed by the second target voltage, the charged particles 1321 of the first color are closer to the second opening(s) 1312 of the microcup(s) 131' where the charged particles 1321 are located than the charged particles 1321 of the second color.

In S130, a third pixel voltage signal is transmitted to a pixel electrode 112' corresponding to the pixel that is to display the second color, and a common voltage signal is transmitted to the common electrode layer 122, so that a third target voltage with a third target value and the first target polarity is generated between the pixel electrode 112' and the common electrode layer 122.

In S130, the third target value is less than the second target value, so that an electric field formed by the third target voltage with the first target polarity can drive the charged particles 132 to move to the first opening(s) 1311 of the microcup(s) 131' where the charged particles are located. Since the third target value is less than the second target value, this makes a migration rate at which the charged particles 132 move to the first opening(s) 1311 of the microcup(s) 131' where the charged particles are located small.

In S230, the charged particles 132 in the region of the pixel to display the second color are driven by the electric field formed by the third target voltage to swim to first opening(s) 1311 of the microcup(s) 131' where the charged particles are located for a third target time, so that the charged particles 1322 of the second color are closer to the first opening(s) 1311 of the microcup(s) 131' where the charged particles are located than the charged particles 1321 of the first color.

Compared with S120 and S220, in S130, when the charged particles 132 are driven by the electric field formed by the third target voltage, the mobility of the charged particles 1321 of the first color and the mobility of the charged particles 1322 of the second color are reduced. Therefore, in S230, in order to drive the charged particles 132 to migrate from the second opening(s) 1312 of the corresponding microcup(s) 131' to the first opening(s) 1311 of the microcup(s) 131' where the charged particles are located, the third target time of the driving of the electric field needs to be greater than the second target time in S220.

In a migration process in S230, since the charged particles 1321 of the first color are initially closer to the second opening(s) 1312 of the microcup(s) 131' than the charged particles 1322 of the second color, and the mobility of the charged particles 1321 of the first color and the mobility of the charged particles 1322 of the second color are relatively small, that is, the movements are relatively slow. Therefore, in the migration process, a position of the charged particles of the first color 1321 relative to the charged particles of the second color 1322 do not change, and the charged particles 1321 of the first color are still closer to the second opening(s) 1312 of the microcup(s) 131' where the charged particles are located than the charged particles 1322 of the second color. Therefore, when the charged particles 132 migrate to the first opening(s) 1311 of the microcup(s) 131' where the charged particles are located, the charged particles 1322 of the second color are closer to the first opening(s) 1311 of the microcup(s) 131' where the charged particles are located than the charged particles 1321 of the first color.

Based on the above driving method, the charged particles 1322 of the second color may be made to be closer to the first opening(s) 1311 of the microcup(s) 131' where the charged particles are located than the charged particles 1321 of the first color, thereby forming a trend of stratification between the charged particles of the second color 1322 and the charged particles of the first color 1321. In this way, after driving in the plurality of cycles, the stratification between the charged particles 1321 of the first color and the charged particles 1322 of the second color becomes more and more obvious, so that the charged particles 1322 of the second color are closer to the first opening(s) 1311 of the microcup(s) 131' where the charged particles are located than the charged particles 1321 of the first color.

For example, as shown in FIG. 5, if the display substrate 1 is to display the red color, the method for driving the display substrate 1 includes the following steps. A second pixel voltage signal (a potential of which is, for example, +15 V) is transmitted to the pixel electrode 112' corresponding to a pixel that is to display the red color, and a common voltage signal (a potential of which is, for example, a ground potential, i.e., a potential of zero) is transmitted to the common electrode layer 122, so that a second target voltage with a second target value (15 V) and a second target polarity (the positive polarity) is generated between the pixel electrode 112' and the common electrode layer 122.

An electric field is formed by using the second target voltage. In this case, a direction of an electric field line is directed from the pixel electrode 112' to the common electrode layer 122, and charged particles 132 in a region of the pixel to display the red color are driven by an electric field force to swim to second opening(s) 1312 of the microcup(s) 131' where the charged particles are located for a second target time (e.g., 30 ms), so as to stratify the black charged particles and the red charged particles. In this case, the black charged particles are closer to the second opening(s) 1312 of the microcup(s) 131' where the charged particles are located than the red charged particles.

Then, a third pixel voltage signal (a potential of which is, for example, −6 V) is transmitted to the pixel electrode 112' corresponding to the pixel to display the red color, and a common voltage signal (a potential of which is, for example, a ground potential, i.e., a potential of zero) is transmitted to the common electrode layer 122, so that a third target voltage with a third target value (6 V) and the first target polarity (e.g., the negative polarity) is generated between the pixel electrode 112' and the common electrode layer 122.

An electric field is formed by using the third target voltage. In this case, a direction of the electric field line is directed from the common electrode layer 122 to the pixel electrode 112', and the charged particles 132 in the region of the pixel to display the red color are driven by an electric field force to swim to first opening(s) 1311 of the microcup(s) 131' for a third target time (e.g., 350 ms). Since a magnitude of the third target voltage is small, an intensity of the electric field formed by the third target voltage is small, and the red charged particles and the black charged particles slowly move to the first opening(s) 1311 of the microcup(s) 131' where the charged particles are located as a whole.

Then, two swimming processes of the charged particles 132 are cyclically performed. There are, for example, 12 cycles, that is, the driving cycles are 12 cycles. The red charged particles are made to be closer to the first opening(s) 1311 of the microcup(s) 131' where the charged particles are located than the black charged particles in a back-and-forth oscillation manner, so that the corresponding pixel displays the red color.

Figure 6:
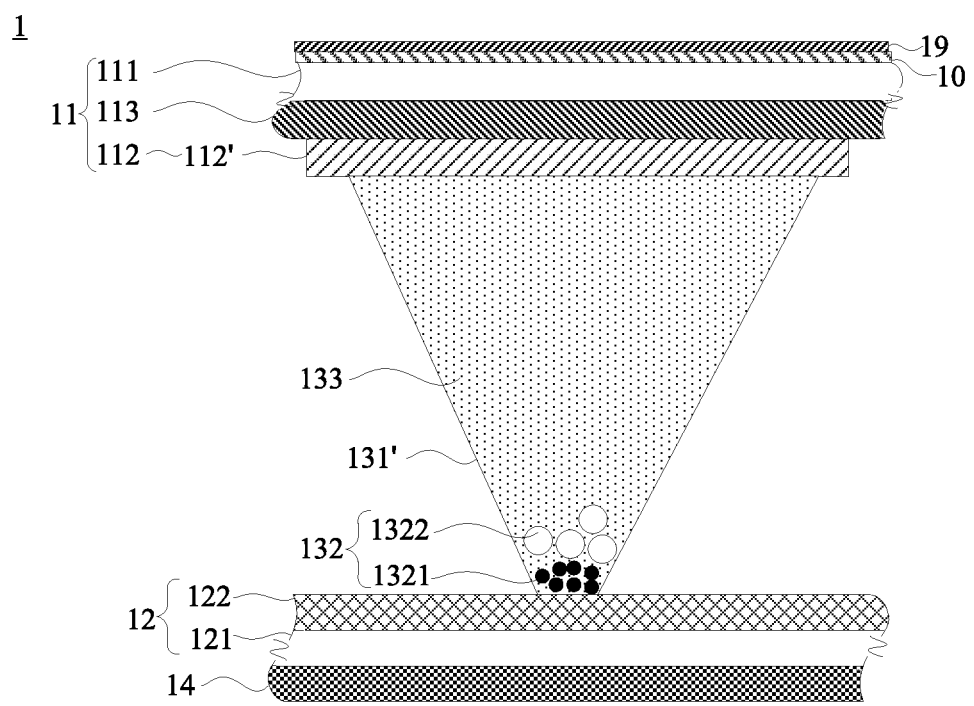
FIG. 6 is a schematic diagram showing a structure of a display substrate in another display state, in accordance with some embodiments.

As shown in FIGS. 6 and 7, in some embodiments, the display substrate 1 further includes the reflective layer 14. The reflective layer 14 is disposed at the side, close to the common electrode layer 122, of the microcup structure layer 131 of the display substrate 1, and is configured to reflect the light of the set color. Correspondingly, the display substrate 1 further has a transparent state mode of the set color.

As shown in FIGS. 6, 7 and 11, for the transparent state mode of the set color, the driving method includes S300 to S400.

In S300, a fourth pixel voltage signal is transmitted to a pixel electrode 112' corresponding to a pixel that is to display the set color in the display substrate 1, and a common voltage signal is transmitted to the common electrode layer 122 of the display substrate 1, so that a set voltage with a set value and a set polarity is generated between the pixel electrode 112' and the common electrode layer 122.

In S300, the set polarity is the same as the polarity of the charged particles, so that an electric field formed by the set voltage with the set polarity can drive the charged particles 132 to move to the second opening(s) 1312 of the corresponding microcup(s) 131'.

In S400, charged particles in a region of the pixel to display the set color are driven by the electric field formed by the set voltage to swim to second opening(s) of corresponding microcup(s) 131' for a set time, so that the charged particles are gathered at the second opening(s) of the microcup(s) 131' and a surrounding region thereof.

The set value, the set polarity and the set time are an absolute value, a polarity, and a duration of a voltage required to enter the transparent state mode of the set color, determined according to the difference in the mobilities of the charged particles 132 of different colors in the display substrate 1.

When the charged particles 132 are driven by the electric field between the pixel electrode layer 112 and the common electrode layer 122 to move to a side of the common electrode layer 122, since the size of the first opening 1311 of each microcup 131' close to the pixel electrode layer 112 is greater than the size of the second opening 1312 opposite to the first opening 1311, the charged particles 132 moving to the side of the common electrode layer 122 cannot shield the second substrate 12, and then the display substrate 1 is in the transparent state. On this basis, in the case where the display substrate 1 includes the reflective layer 14 with the set color, the display substrate 1 displays the color of the reflective layer 14.

For example, as shown in FIG. 6, the charged particles 132 are set to be positively charged, and the color of the reflective layer 14 is set to be yellow. If the display substrate 1 is to display the yellow color, the method for driving the display substrate 1 includes S310 to S410.

In S310, a fourth pixel voltage signal (a potential of which is, for example, +20 V) is transmitted to the pixel electrode 112' corresponding to a pixel that is to display the color of the reflective layer 14 in the display substrate 1, and a common voltage signal (a potential of which is, for example, a ground potential, i.e., a potential of zero) is transmitted to the common electrode layer 122 of the display substrate 1, so that a set voltage with a set value (20 V) and a set polarity (the positive polarity) is generated between the pixel electrode 112' and the common electrode layer 122.

In S410, an electric field is formed by using the set voltage. In this case, a direction of an electric field line is directed from the pixel electrode to the common electrode layer 122, and the charged particles 132 in the region of the pixel to display the set color are driven by an electric field force to swim to the second opening(s) 1312 of the microcup(s) 131' where the charged particles are located for the set time (e.g., 2000 ms), so that the charged particles 132 are gathered at the second opening(s) 1312 of the microcup(s) 131' where the charged particles are located and the surrounding region thereof.

In a case where the orthographic projection of the second opening 1312 on the second substrate 12 has the shape of a closed figure, and the distance between any point on the boundary of the closed figure to any other point on the boundary is less than or equal to the limit resolution size of the human eyes, the human eyes cannot observe the color of the charged particles. In this case, the charged particles 132 cannot shield the color of the reflective layer 14, and the pixel to be displayed in the display substrate 1 displays the yellow color.

In some embodiments, as shown in FIG. 7, when the display substrate 1 is in the transparent state mode, by controlling a distribution position of the charged particles 132 in the microcup(s) 131' where the charged particles are located, the display substrate 1 can have transparencies to different degrees, so that the display substrate 1 displays the colors of the reflective layer 14 with different brightnesses. Therefore, for the transparent state mode of the set color, the driving method further includes:

reducing the set value of the set voltage, and/or reducing the set time of driving of the set voltage, so as to reduce a gather density of the charged particles 132 at second opening(s) 1312 of the microcup(s) 131' where the charged particles are located and a surrounding region thereof, and to make a brightness of the set color displayed by the display substrate 1 low; and increasing the set value of the set voltage, and/or increasing the set time of the driving of the set voltage, so as to increase the gather density of the charged particles at the second opening(s) 1312 of the microcup(s) 131' where the charged particles are located and the surrounding region thereof, and to make the brightness of the set color displayed by the display substrate 1 high.

For example, the fourth pixel voltage signal transmitted to the pixel electrode 112' corresponding to the pixel that is to display the color of the reflective layer 14 in the display substrate 1 is reduced to +18 V, so that the field intensity of the electric field formed by the set voltage is reduced. The set time of the driving of the set voltage is reduced to 1800 ms, which makes the distribution density of the charged particles 132 gathering at the second opening(s) 1312 of the microcup(s) 131' in the region of the pixel to display the color of the reflective layer 14 and the surrounding region thereof reduced. In this case, the charged particles 132 slightly shield the color of the reflective layer 14, and the pixel to be displayed displays a yellow color at a first brightness level.

For example, the fourth pixel voltage signal transmitted to the pixel electrode 112' corresponding to the pixel that is to display the color of the reflective layer 14 in the display substrate 1 is reduced to +18 V, so that the field intensity of the electric field formed by the set voltage is reduced. The set time of the driving of the set voltage is reduced to 1500 ms, which makes the distribution density of the charged particles 132 gathering at the second opening(s) 1312 of the microcup(s) 131' in the region of the pixel to display the color of the reflective layer 14 and the surrounding region thereof further reduced. In this case, the charged particles 132 further shield the color of the reflective layer 14, and the pixel to be displayed displays a yellow color at a second brightness level.

For example, the fourth pixel voltage signal transmitted to the pixel electrode 112' corresponding to the pixel that is to display the color of the reflective layer 14 in the display substrate 1 is reduced to +16 V, so that the field intensity of the electric field formed by the set voltage is reduced. The set time of the driving of the set voltage is reduced to 1300 ms, which makes the distribution density of the charged particles 132 gathering at the second opening(s) 1312 of the microcup(s) 131' in the region of the pixel to display the color of the reflective layer 14 and the surrounding region thereof further reduced. In this case, the charged particles 132 further shield the color of the reflective layer 14, and the pixel to be displayed displays a yellow color at a third brightness level.

The brightnesses of the yellow color at the first brightness level, the yellow color at the second brightness level and the yellow color at the third brightness level are gradually lowered.

It will be noted that, the foregoing embodiments are described by taking an example in which the charged particles 132 positively charged. If the charged particles 132 are negatively charged, the polarity of the target voltage is required to be changed when the electric field formed by the target voltage is used to drive the charged particles 132 in the microcup(s) 131' corresponding to the pixel to display the target color.

In the description of the above embodiments, specific features, structures, materials or characteristics may be combined in any suitable manner in any one or more embodiments or examples.

The forgoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A display substrate, comprising:
   a first substrate including a pixel electrode layer, the pixel electrode layer including a plurality of pixel electrodes;
   a microcup structure layer disposed on a side of the first substrate, the microcup structure layer including a plurality of microcups, each microcup having a first opening and a second opening opposite to the first opening, the first opening is closer to the pixel electrode layer than the second opening and a size of the first opening being greater than a size of the second opening;
   an electrophoretic fluid filled in the plurality of microcups, the electrophoretic fluid being incorporated with charged particles; and
   a second substrate disposed on a side, away from the first substrate, of the microcup structure layer with the electrophoretic fluid, the second substrate including a common electrode layer,
   wherein an orthographic projection of the second opening of each microcup on the second substrate has a shape of a closed figure, and a distance from any point on a boundary of the closed figure to any other point on the boundary of the closed figure is less than or equal to a limit resolution size of human eyes.

2. The display substrate according to claim 1, wherein the electrophoretic fluid is incorporated with charged particles of at least two colors, the charged particles of the at least two colors have a same electrical property, and mobilities of charged particles of different colors are different.

3. The display substrate according to claim 2, wherein the charged particles of the at least two colors include charged particles of a first color and charged particles of a second color, and the charged particles of the first color have a greater specific charge than the charged particles of the second color.

4. The display substrate according to claim 1, further comprising a reflective layer disposed at a side, proximate to the common electrode layer or the pixel electrode layer, of the microcup structure layer, the reflective layer being configured to reflect light of a set color.

5. The display substrate according to claim 1, wherein a width of a gap between orthographic projections of first openings of two adjacent microcups on the first substrate is less than or equal to the limit resolution size of the human eyes.

6. The display substrate according to claim 5, wherein the distance from any point on the boundary of the closed figure to any other point on the boundary of the closed figure is less than or equal to 15 µm; and
   the width of the gap between the orthographic projections of the first openings of the two adjacent microcups on the first substrate is less than or equal to 15 µm.

7. The display substrate according to claim 1, wherein a shape of each microcup is a truncated pyramid or a truncated cone.

8. The display substrate according to claim 7, wherein the shape of each microcup is a regular hexagonal truncated pyramid.

9. The display substrate according to claim 8, wherein a shortest distance between two opposite sides of the first opening of each microcup ranges from 140 µm to 160 µm; and
   a width of a gap between orthographic projections of second openings of two adjacent microcups on the second substrate ranges from 140 µm to 160 µm.

10. The display substrate according to claim 1, wherein a dimension of each microcup in a direction perpendicular to the first substrate ranges from 140 µm to 160 µm.

11. The display substrate according to claim 1, wherein the first substrate further includes:
    a first base, disposed at a side, away from the microcup structure layer, of the pixel electrode layer; and
    an active device layer disposed between the first base and the pixel electrode layer, the active device layer including
      a plurality of driving switch transistors, and the plurality of driving switch transistors being electrically connected to the plurality of pixel electrodes in the pixel electrode layer, respectively;
      a plurality of transparent first storage capacitor electrodes electrically connected to the plurality of driving switch transistors, respectively; and
      a plurality of transparent second storage capacitor electrodes corresponding to the plurality of transparent first storage capacitor electrodes, respectively, an orthographic projection of a first storage capacitor electrode on the first base and an orthographic projection of a corresponding second storage capacitor electrode on the first base having an overlapping region therebetween.

12. The display substrate according to claim 11, wherein each of the plurality of driving switch transistors includes a gate, a source and a drain, and the gate, the source and the drain are made of a transparent material.

13. A display device, comprising the display substrate according to claim 1.

14. A method for driving a display substrate, configured to drive a display substrate, the display substrate comprising a first substrate, a microcup structure layer, an electrophoretic fluid and a second substrate, the first substrate including a pixel electrode layer, the pixel electrode layer including a plurality of pixel electrodes, the microcup structure layer being disposed on a side of the first substrate, the microcup structure layer including a plurality of microcups, each microcup having a first opening and a second opening opposite to the first opening, the first opening being closer to the pixel electrode layer than the second opening and a size of the first opening being greater than a size of the second opening, the electrophoretic fluid being filled in the plurality of microcups, the electrophoretic fluid being incorporated with charged particles, the second substrate being disposed on a side, away from the first substrate, of the microcup structure layer with the electrophoretic fluid, the second substrate including a common electrode layer, the electrophoretic fluid being incorporated with charged particles of at least two colors, the charged particles of the at least two colors having a same electrical property, and mobilities of charged particles of different colors being different, the display substrate having ink state modes of at least two colors;

for each of the ink state modes of the at least two colors, the driving method comprising:

transmitting a pixel voltage signal for a target time to a pixel electrode corresponding to a pixel that is to display a target color in the display substrate; and transmitting a common voltage signal to the common electrode layer of the display substrate for the target time, so that a target voltage with a target value and a target polarity is generated between the pixel electrode and the common electrode layer, and charged particles in a region of the pixel that is to display the target color are driven by an electric field formed by the target voltage to swim for the target time, so that charged particles of the target color are closer to the first opening of the microcup where the charged particles are located than charged particles of other colors, wherein the target value, the target polarity, and the target time is an absolute value, a polarity and a duration of a voltage required to enter an ink state mode of the target color, determined according to a difference in the mobilities of the charged particles of the different colors in the display substrate.

15. The driving method according to claim 14, wherein the display substrate includes charged particles of a first color and charged particles of a second color, and a mobility of the charged particles of the first color is greater than a mobility of the charged particles of the second color; and the display substrate has an ink state mode of the first color and an ink state mode of the second color.

16. The driving method according to claim 15, wherein for the ink state mode of the first color, the driving method comprises:

transmitting a first pixel voltage signal for a first target time to a pixel electrode corresponding to a pixel that is to display the first color, and transmitting a common voltage signal to the common electrode layer for the first target time, so that a first target voltage with a first target value and a first target polarity is generated between the pixel electrode and the common electrode layer, the first target polarity being opposite to a polarity of the charged particles, and charged particles in a region of the pixel that is to display the first color are driven by an electric field formed by the first target voltage to swim to the first opening of the microcup where the charged particles are located for the first target time, so that the charged particles of the first color are closer to the first opening of the microcup where the charged particles are located than the charged particles of the second color.

17. The driving method according to claim 15, wherein for the ink state mode of the second color, the driving method comprises a plurality of driving cycles, and each of the driving cycles includes:

transmitting a second pixel voltage signal for a second target time to a pixel electrode corresponding to a pixel that is to display the second color, transmitting a common voltage signal for the second target time to the common electrode layer, so that a second target voltage with a second target value and a second target polarity is generated between the pixel electrode and the common electrode layer, the second target polarity being the same as the polarity of the charged particles, and charged particles in a region of the pixel that is to display the second color are driven by an electric field formed by the second target voltage to swim to the second opening of the microcup where the charged particles are located for the second target time, so that the charged particles of the first color and the charged particles of the second color are stratified, and the charged particles of the first color are closer to the second opening of the microcup where the charged particles are located than the charged particles of the second color;

transmitting a third pixel voltage signal for a third target time to a pixel electrode corresponding to the pixel that is to display the second color, and transmitting a common voltage signal for the third target time to the common electrode layer, so that a third target voltage with a third target value and a third target polarity is generated between the pixel electrode and the common electrode layer, the third target value being less than the second target value, and the charged particles in the region of the pixel that is to display the second color are driven by an electric field formed by the third target voltage to swim to the first opening of the microcup where the charged particles are located for the third target time, so that the charged particles of the second color are closer to the first opening of the microcup where the charged particles are located than the charged particles of the first color, the third target time being greater than the second target time.

18. The driving method according to claim 17, wherein the display substrate further includes a reflective layer, and the reflective layer is disposed at a side, proximate to the common electrode layer, of the microcup structure layer of the display substrate, and is configured to reflect light of a set color; and the display substrate further has a transparent state mode of the set color;

for the transparent state mode of the set color, the driving method comprises:

transmitting a fourth pixel voltage signal for a set time to a pixel electrode corresponding to a pixel that is to display the set color in the display substrate, and transmitting a common voltage signal for the set time to the common electrode layer of the display substrate, so that a set voltage with a set value and a set polarity is generated between the pixel electrode and the common electrode layer, the set polarity being the same as the polarity of the charged particles, and charged particles in a region of the pixel that is to display the set color are driven by an electric field formed by the set voltage to swim to the second opening of microcup where the charged particles are located for the set time, so that the charged particles gather at the second opening of the microcup and a surrounding region thereof, wherein the set value, the set polarity, and the set time are an absolute value, a polarity and a duration of a voltage required to enter the transparent state mode of the set color, determined according to the difference in the mobilities of the charged particles of the different colors in the display substrate.

19. The driving method according to claim 18, wherein for the transparent state mode of the set color, the driving method further comprises:
reducing the set value of the set voltage, and/or the set time of driving of the electric field formed by the set voltage, so as to reduce a gather density of the charged particles at the second opening of the microcup where the charged particles are located and a surrounding region thereof, and to make a brightness of the set color displayed by the display substrate low; and
increasing the set value of the set voltage, and/or the set time of the driving of the electric field formed by the set voltage, so as to increase the gather density of the charged particles at the second opening of the microcup where the charged particles are located and the surrounding region thereof, and to make the brightness of the set color displayed by the display substrate high.

20. A display substrate, comprising:
a first substrate including a pixel electrode layer, a first base and an active device layer, the active device layer being disposed between the first base and the pixel electrode layer, the pixel electrode layer including a plurality of pixel electrodes;
a microcup structure layer disposed on a side of the first substrate, the microcup structure layer including a plurality of microcups, each microcup having a first opening and a second opening opposite to the first opening, the first opening is closer to the pixel electrode layer than the second opening and a size of the first opening being greater than a size of the second opening, the first base being disposed at a side, away from the microcup structure layer, of the pixel electrode layer;
an electrophoretic fluid filled in the plurality of microcups, the electrophoretic fluid being incorporated with charged particles; and
a second substrate disposed on a side, away from the first substrate, of the microcup structure layer with the electrophoretic fluid, the second substrate including a common electrode layer, wherein
the active device layer includes:
a plurality of driving switch transistors, the plurality of driving switch transistors being electrically connected to the plurality of pixel electrodes in the pixel electrode layer, respectively;
a plurality of transparent first storage capacitor electrodes electrically connected to the plurality of driving switch transistors, respectively; and
a plurality of transparent second storage capacitor electrodes corresponding to the plurality of transparent first storage capacitor electrodes, respectively, an orthographic projection of a first storage capacitor electrode on the first base and an orthographic projection of a corresponding second storage capacitor electrode on the first base having an overlapping region therebetween.

* * * * *